US011199974B2

(12) United States Patent
Matsuyama et al.

(10) Patent No.: US 11,199,974 B2
(45) Date of Patent: Dec. 14, 2021

(54) ALLOCATION OF MEMORY REGIONS OF A NONVOLATILE SEMICONDUCTOR MEMORY FOR STREAM-BASED DATA WRITING

(71) Applicant: KIOXIA CORPORATION, Tokyo (JP)

(72) Inventors: Motohiro Matsuyama, Inagi Tokyo (JP); Yoshihisa Kojima, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/927,492

(22) Filed: Jul. 13, 2020

(65) Prior Publication Data

US 2020/0341654 A1    Oct. 29, 2020

Related U.S. Application Data

(63) Continuation of application No. 15/826,415, filed on Nov. 29, 2017, now Pat. No. 10,747,444.

(30) Foreign Application Priority Data

Nov. 29, 2016    (JP) .............................. JP2016-231246

(51) Int. Cl.
    *G06F 3/06*    (2006.01)
(52) U.S. Cl.
    CPC .......... *G06F 3/0611* (2013.01); *G06F 3/0656* (2013.01); *G06F 3/0659* (2013.01); *G06F 3/0688* (2013.01)
(58) Field of Classification Search
    CPC .... G06F 3/0611; G06F 3/0656; G06F 3/0659; G06F 3/0688
    See application file for complete search history.

(56) References Cited

U.S. PATENT DOCUMENTS 6,986,019 B1    1/2006    Bagashev et al.
7,065,619 B1    6/2006    Zhu et al.
(Continued)

FOREIGN PATENT DOCUMENTS

IN    201641029370    8/2016

OTHER PUBLICATIONS

NCITS Technical Committee T10, "SCSI Block Command—4 (Rev.11)," [online], Jun. 30, 2016, the Internet <URL: rittp://www.t10.org/drafts.htm#SBC Family>.

*Primary Examiner* — Nanci N Wong
(74) *Attorney, Agent, or Firm* — Kim & Stewart LLP

(57) ABSTRACT

A semiconductor storage device comprises a nonvolatile semiconductor memory with memory regions, threads, and a controller. Each thread includes a buffer region in which write data from a host are stored before the write data are written to one of the memory regions, and the buffer region of each thread is different from buffer regions of the other threads. The controller receives stream data from the host, each stream data being associated with one of multiple stream identifications, allocates each stream identification to one of the threads according to priority levels assigned to the stream identifications, such that a stream identification assigned a highest priority level is allocated to a thread to which none of other stream identifications are allocated, and writes each stream data stored in the buffer regions to one of the memory regions according to stream identification of the stream data.

20 Claims, 24 Drawing Sheets

(56) References Cited

U.S. PATENT DOCUMENTS

| | | |
|---|---|---|
| 7,713,068 B2 | 5/2010 | Flynn et al. |
| 8,423,722 B1 | 4/2013 | Deforest et al. |
| 9,158,687 B2 | 10/2015 | Barrell et al. |
| 9,335,950 B2 | 5/2016 | Horn |
| 2005/0283822 A1 | 12/2005 | Appleby et al. |
| 2012/0254524 A1 | 10/2012 | Fujimoto |
| 2015/0074337 A1 | 3/2015 | Jo et al. |
| 2015/0261473 A1 | 9/2015 | Matsuyama et al. |
| 2015/0286420 A1 | 10/2015 | Crisman et al. |
| 2017/0272494 A1 | 9/2017 | Huen et al. |
| 2017/0344470 A1 | 11/2017 | Yang et al. |
| 2018/0059988 A1 | 3/2018 | Shivanand et al. |
| 2018/0113642 A1 | 4/2018 | Huen et al. |

STREAM CONTROL COMMAND

| Byte \ Bit | 7 | 6 | 5 | 4 | 3 | 2 | 1 | 0 |
|---|---|---|---|---|---|---|---|---|
| 0 | OPERATION CODE (9Eh) | | | | | | | |
| 1 | Rsv | STR_CTL | | SERVICE ACTION (14h) | | | | |
| 2 | Reserved | | | | | | | |
| 3 | Reserved | | | | | | | |
| 4 | STR_ID | | | | | | | |
| 5 | | | | | | | | |
| 6 | Reserved | | | | | | | |
| ... | | | | | | | | |
| 9 | | | | | | | | |
| 10 | ALLOCATION LENGTH | | | | | | | |
| ... | | | | | | | | |
| 13 | | | | | | | | |
| 14 | Reserved | | | | | | | |
| 15 | CONTROL | | | | | | | |

WRITE STREAM COMMAND

| Byte \ Bit | 7 | 6 | 5 | 4 | 3 | 2 | 1 | 0 |
|---|---|---|---|---|---|---|---|---|
| 0 | OPERATION CODE (9Ah) | | | | | | | |
| 1 | WRPROTECT | | | DPO | FUA | Reserved | | |
| 2 | LBA | | | | | | | |
| ... | | | | | | | | |
| 9 | | | | | | | | |
| 10 | STR_ID | | | | | | | |
| 11 | | | | | | | | |
| 12 | TRANSFER LENGTH | | | | | | | |
| 13 | | | | | | | | |
| 14 | Rsvd | | | GROUP NUMBER | | | | |
| 15 | CONTROL | | | | | | | |

FIG. 17

STREAM/THREAD CONVERSION TABLE — 232

| STREAM ID | HOST THROUGHPUT | PRIORITY LEVEL | THREAD ID |
|---|---|---|---|
| 1 | 1200MB/s | 1 | #1 |
| 2 | 1100MB/s | 2 | #2 |
| 3 | 1050MB/s | 3 | #3 |
| 4 | 1000MB/s | 4 | #4 |
| 5 | 950MB/s | 5 | #5 |
| 6 | 900MB/s | 6 | #6 |
| 7 | 850MB/s | 7 | #7 |
| 8 | 100MB/s | 8 | #8 |
| 9 | 100MB/s | 9 | #8 |
| ... | ... | ... | ... |
| 15 | 100MB/s | 15 | #8 |
| 16 | 100MB/s | 16 | #8 |

FIG. 26A

| No | START LBA | END LBA | ACCUMULATION AMOUNT | GENERATION |
|---|---|---|---|---|
| 0 | | | | |
| 1 | | | | |
| 2 | | | | |
| LONG DETERMINATION FLAG = 0 | | | | |

COMMAND A
START LBA = 0x1000
TRANSFER LENGTH = 0x200

FIG. 26B

| No | START LBA | END LBA | ACCUMULATION AMOUNT | GENERATION |
|---|---|---|---|---|
| 0 | 0x1000 | 0x11FF | 0x200 | 1 |
| 1 | | | | |
| 2 | | | | |
| LONG DETERMINATION FLAG = 0 | | | | |

COMMAND B
START LBA = 0x1200
TRANSFER LENGTH = 0x100

FIG. 26C

| No | START LBA | END LBA | ACCUMULATION AMOUNT | GENERATION |
|---|---|---|---|---|
| 0 | 0x1000 | 0x12FF | 0x300 | 1 |
| 1 | | | | |
| 2 | | | | |
| LONG DETERMINATION FLAG = 0 | | | | |

COMMAND C
START LBA = 0x1400
TRANSFER LENGTH = 0x200

FIG. 26D

| No | START LBA | END LBA | ACCUMULATION AMOUNT | GENERATION |
|---|---|---|---|---|
| 0 | 0x1000 | 0x12FF | 0x300 | 2 |
| 1 | 0x1400 | 0x15FF | 0x200 | 1 |
| 2 | | | | |
| LONG DETERMINATION FLAG = 0 | | | | |

COMMAND D
START LBA = 0x0E00
TRANSFER LENGTH = 0x100

FIG. 26E

| No | START LBA | END LBA | ACCUMULATION AMOUNT | GENERATION |
|---|---|---|---|---|
| 0 | 0x1000 | 0x12FF | 0x300 | 3 |
| 1 | 0x1400 | 0x15FF | 0x200 | 2 |
| 2 | 0x0E00 | 0x0EFF | 0x100 | 1 |
| LONG DETERMINATION FLAG = 0 | | | | |

COMMAND E
START LBA = 0x1300
TRANSFER LENGTH = 0x100

FIG. 26F

| No | START LBA | END LBA | ACCUMULATION AMOUNT | GENERATION |
|---|---|---|---|---|
| 0 | 0x1000 | 0x15FF | 0x600 | 1 |
| 1 | | | | |
| 2 | 0x0E00 | 0x0EFF | 0x100 | 2 |
| LONG DETERMINATION FLAG = 0 | | | | |

COMMAND F
START LBA = 0x0F00
TRANSFER LENGTH = 0x100

FIG. 26G

| No | START LBA | END LBA | ACCUMULATION AMOUNT | GENERATION |
|---|---|---|---|---|
| 0 | | | | |
| 1 | | | | |
| 2 | 0x0E00 | 0x15FF | 0x800 | 1 |
| LONG DETERMINATION FLAG = 1 | | | | |

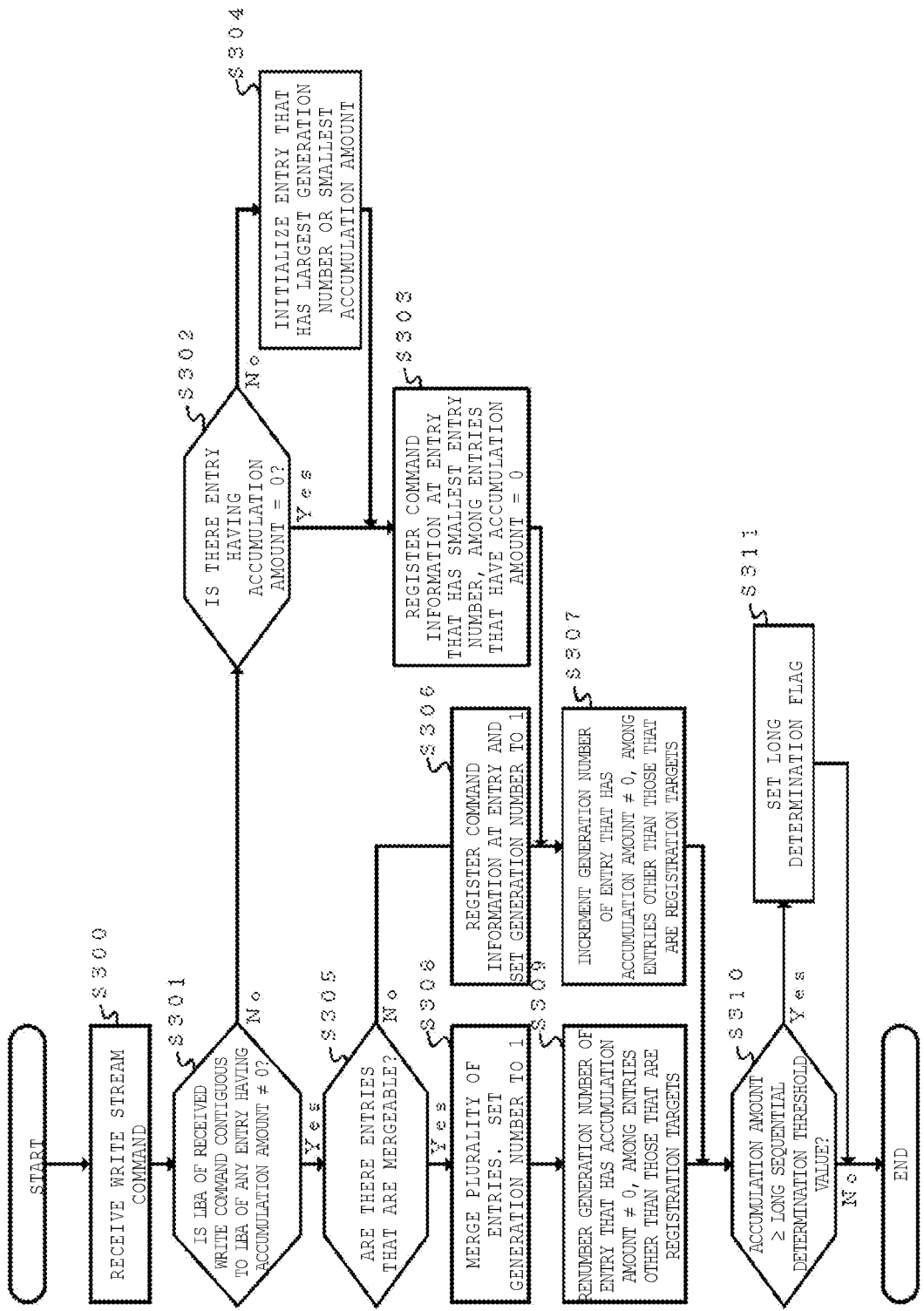

FIG. 29A

| No | START LBA | END LBA | ACCUMULATION AMOUNT | GENERATION | ID |
|---|---|---|---|---|---|
| 0 | | | | | |
| 1 | | | | | |
| 2 | | | | | |

↓ COMMAND A
START LBA = 0x1000
TRANSFER LENGTH = 0x200

FIG. 29B

| No | START LBA | END LBA | ACCUMULATION AMOUNT | GENERATION | ID |
|---|---|---|---|---|---|
| 0 | 0x1000 | 0x11FF | 0x200 | 1 | |
| 1 | | | | | |
| 2 | | | | | |

↓ COMMAND B
START LBA = 0x1200
TRANSFER LENGTH = 0x100

FIG. 29C

| No | START LBA | END LBA | ACCUMULATION AMOUNT | GENERATION | ID |
|---|---|---|---|---|---|
| 0 | 0x1000 | 0x12FF | 0x300 | 1 | |
| 1 | | | | | |
| 2 | | | | | |

↓ COMMAND C
START LBA = 0x1400
TRANSFER LENGTH = 0x200

FIG. 29D

| No | START LBA | END LBA | ACCUMULATION AMOUNT | GENERATION | ID |
|---|---|---|---|---|---|
| 0 | 0x1000 | 0x12FF | 0x300 | 2 | |
| 1 | 0x1400 | 0x15FF | 0x200 | 1 | |
| 2 | | | | | |

↓ COMMAND D
START LBA = 0x0E00
TRANSFER LENGTH = 0x100

FIG. 29E

| No | START LBA | END LBA | ACCUMULATION AMOUNT | GENERATION | ID |
|---|---|---|---|---|---|
| 0 | 0x1000 | 0x12FF | 0x300 | 3 | |
| 1 | 0x1400 | 0x15FF | 0x200 | 2 | |
| 2 | 0x0E00 | 0x0EFF | 0x100 | 1 | |

↓ COMMAND E
START LBA = 0x1300
TRANSFER LENGTH = 0x100

FIG. 29F

| No | START LBA | END LBA | ACCUMULATION AMOUNT | GENERATION | ID |
|---|---|---|---|---|---|
| 0 | 0x1000 | 0x15FF | 0x600 | 1 | |
| 1 | | | | | |
| 2 | 0x0E00 | 0x0EFF | 0x100 | 2 | |

↓ COMMAND F
START LBA = 0x2000
TRANSFER LENGTH = 0x200

FIG. 29G

| No | START LBA | END LBA | ACCUMULATION AMOUNT | GENERATION | ID |
|---|---|---|---|---|---|
| 0 | 0x1000 | 0x15FF | 0x600 | 2 | |
| 1 | 0x2000 | 0x21FF | 0x200 | 1 | |
| 2 | 0x0E00 | 0x0EFF | 0x100 | 3 | |

↓ COMMAND G
START LBA = 0x0F00
TRANSFER LENGTH = 0x100

FIG. 29H

| No | START LBA | END LBA | ACCUMULATION AMOUNT | GENERATION | ID |
|---|---|---|---|---|---|
| 0 | | | | | |
| 1 | 0x2000 | 0x21FF | 0x200 | 2 | |
| 2 | 0x0E00 | 0x15FF | 0x800 | 1 | 1 | ures
ALLOCATION OF MEMORY REGIONS OF A NONVOLATILE SEMICONDUCTOR MEMORY FOR STREAM-BASED DATA WRITING

CROSS-REFERENCE TO RELATED APPLICATION

This application is a continuation of U.S. patent application Ser. No. 15/826,415, filed Nov. 29, 2017, which application is based upon and claims the benefit of priority from Japanese Patent Application No. 2016-231246, filed Nov. 29, 2016, the entire contents of which are incorporated herein by reference.

FIELD

Embodiments described herein relate generally to a semiconductor storage device.

BACKGROUND

In a nonvolatile semiconductor memory, it is required or at least preferable to reduce the number of times data is written to and erased from the memory so that the reliability of storage device can be maintained and read/write performance can be improved. Furthermore, from the perspective of cost and power consumption, it is important to limit the circuit size of a memory controller in a semiconductor storage device.

DESCRIPTION OF THE DRAWINGS

FIG. 17 illustrates a structure of a stream/thread conversion table according to the first embodiment.

FIGS. 26A to 26G illustrate a transition of a long sequential determination table according to the second embodiment.

FIG. 27 is a flowchart for a procedure of updating the long sequential determination table according to the second embodiment.

FIGS. 29A to 29H illustrate a transition of a long sequential determination table according to a third embodiment.

DETAILED DESCRIPTION

Figure 1:
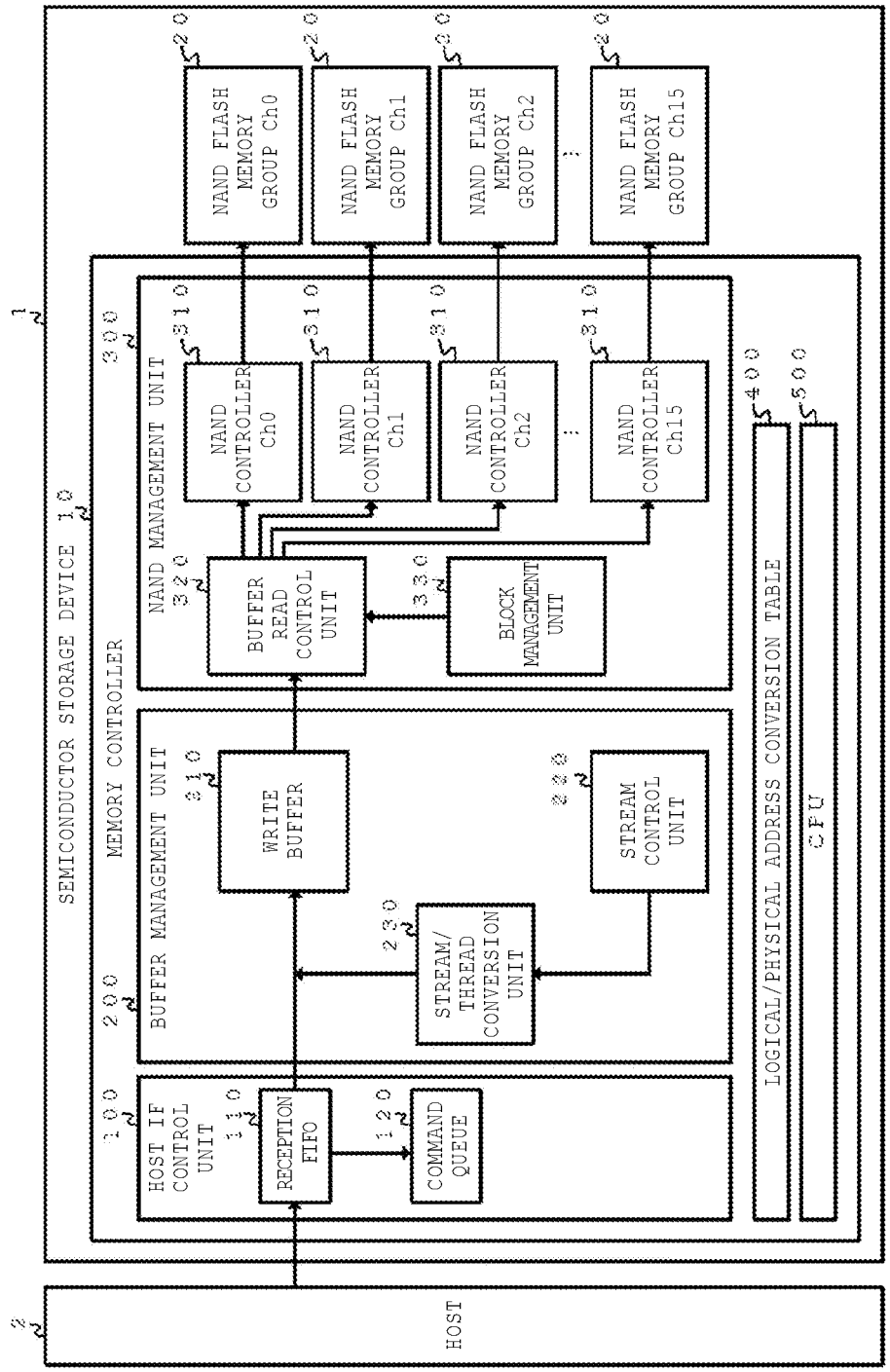
FIG. 1 is a block diagram of a semiconductor storage device according to a first embodiment.

An embodiment is directed to improving reliability, device lifetime, and performance of a semiconductor storage device.

In general, according to one embodiment, a semiconductor storage device comprises a nonvolatile semiconductor memory including a plurality of memory regions, a plurality of threads, wherein each thread includes a buffer region in which write data from a host are stored before the write data are written to one of the memory regions, and the buffer region of each of the plurality of threads is different from buffer regions of other threads of the plurality of threads, and a controller. The controller receives a plurality of stream data from the host, each of the plurality of stream data being associated with one of a plurality of stream identifications, allocates each of the plurality of stream identifications to one of the plurality of threads according to priority levels assigned to the plurality of stream identifications, such that a stream identification assigned a highest priority level is allocated to a thread to which none of other stream identifications are allocated, and writes each stream data stored in the buffer regions to one of the plurality of memory regions according to stream identification of the stream data.

A semiconductor storage device according to an embodiment will be described below with reference to the drawings. It is noted that, in the following description, elements having the same function or configuration are given the same reference numeral.

First Embodiment

FIG. 1 is a block diagram of a semiconductor storage device 1 according a first embodiment.

A semiconductor storage device 1 includes a memory controller 10 and a nonvolatile semiconductor memory 20. In the following description, functional elements necessary for reading data from the nonvolatile semiconductor memory 20 are omitted.

A memory controller 10 communicates with a host 2 and controls operation of the entire semiconductor storage device 1. The memory controller 10, for example, is a semiconductor integrated circuit that is configured as a system on a chip (SoC).

According to the present embodiment, the host 2 is described as a computer that supports an interface based on the Serial Attached SCSI (SAS) specifications. However, the host 2 may be a computer that supports an interface based on other specifications, for example, Serial ATA (SATA) specifications or NVM Express (NVMe®) specifications. The semiconductor storage device 1 may be configured in such a manner that communication with a plurality of hosts 2 can be performed.

A nonvolatile semiconductor memory 20 stores data in a nonvolatile manner. The nonvolatile semiconductor memory 20 according to the present embodiment is a NAND flash memory, but may be a different type of nonvolatile semiconductor memory, such as three-dimensionally structured flash memory, a NOR flash memory, or Magnetoresistive Random Access Memory (MRAM).

In some cases, the nonvolatile semiconductor memory 20 is hereinafter expressed as a NAND flash memory 20. The semiconductor storage device 1 according to the present embodiment has the NAND flash memory 20 with 16 channels (Ch). The memory controller 10 can, in parallel, control the NAND flash memory chips 20 which are connected to the channels, respectively. A plurality of NAND flash memory chips 20 may be connected to one channel. The NAND flash memory chips 20 that are connected to the channels are hereinafter expressed as NAND flash memory groups Ch0 to Ch15. It is noted that the number of channels may be larger than or smaller than 16.

The memory controller 10 includes a host interface (IF) control unit 100, a buffer management unit 200, a NAND management unit 300, a logical/physical address conversion table 400, and a central processing unit (CPU) 500.

The host IF control unit 100 performs interpretation and execution of a command received from the host 2. The host IF control unit 100 includes a reception FIFO 110 and a command queue 120.

The reception FIFO 110 temporarily stores write data and a command received from the host 2. The command queue 120 queues the command received from the host 2.

The buffer management unit 200 manages a buffer 210. The buffer management unit 200 includes the buffer 210, a stream control unit 220, and a stream/thread conversion unit 230. The buffer 210 temporarily stores write data received from the host 2. The buffer 210 according to the present embodiment is a memory configured with Static Random Access Memory (SRAM), but different types of memories, such as Dynamic Random Access Memory (DRAM), may be employed for the buffer 210. The stream control unit 220 performs write control of stream data, which will be described later. The stream/thread conversion unit 230 performs conversion of a stream and a thread, which will be described later.

The NAND management unit 300 manages data write to the NAND flash memory 20. The NAND management unit 300 includes NAND controllers 310, a buffer read control unit 320, and a block management unit 330. Each of the NAND controllers 310 is connected to each of the NAND flash memory groups Ch0 to Ch15. The NAND controller 310 controls operations, such as data write to, data read from, and data erasing from the NAND flash memory 20. In some cases, the NAND controllers 310 are hereinafter expressed as NAND controllers Ch0 to Ch15. The buffer read control unit 320 transfers data that are read from the buffer 210, to each of the NAND controllers 310. The block management unit 330 prepares a logical block as a data write destination, for every thread, which will be described later.

The logical/physical address conversion table 400 is used to convert a logical address that is designated in a command received from the host 2 to a physical address of the NAND flash memory 20. The CPU 500 performs control of the entire semiconductor storage device 1 based on firmware (FW).

It is noted that the buffer 210 and the CPU 500 may be formed as a separate semiconductor integrated circuit, instead of being built into the memory controller 10. Furthermore, it is possible that some or all of the functions which, in the following description, are to be performed by executing the FW are performed by dedicated hardware (HW), and it is possible that some or all of the functions which are to be performed by HW are performed by executing the FW.

Indexes for evaluating properties of the semiconductor storage device 1 include a write amplification factor (WAF). The WAF is determined by the following equation (1).

$$\text{WAF} = \text{(a total amount of data written to the NAND flash memory 20)} / \text{(a total amount of write data received from the host 2)} \quad \text{Equation (1)}$$

The WAF varies with the amount of user data being written to the NAND flash memory 20, the amount of management data associated with operations of the storage device to be written to the NAND flash memory 20, the amount of redundant data (such as ECC: error correcting code) being supplied, and the frequency of garbage collection (also referred to as "compaction") operations. In a NAND flash memory 20, the more data writing or data erasing operations are performed, the more the storage elements deteriorate. Therefore, it is desirable that the number of writings and erasings be kept as small as possible, and it is also desirable that the WAF be low.

Next, configurations of a physical page 600 and a physical block 610 of the NAND flash memory 20 according to the present embodiment are described with reference to FIGS. 2A and 2B.

Figure 2A:
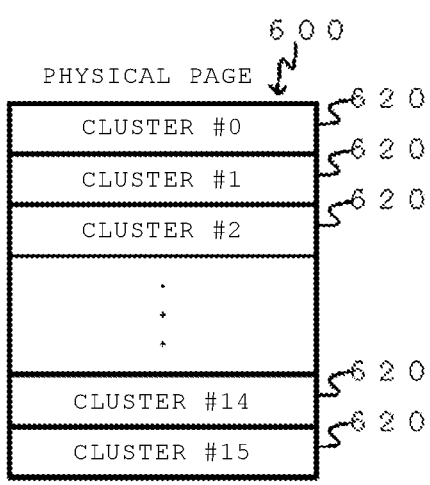
FIGS. 2A and 2B schematically illustrate configurations of a physical page and a physical block according to the first embodiment.

As illustrated in FIG. 2A, a minimum unit of management of the data read from and the data write to the NAND flash memory 20 is one cluster 620. According to the present embodiment, a size of the cluster 620 is, for example, 4 kB. Furthermore, a minimum unit for the data read operation or the data write operation within the NAND flash memory 20 is one physical page 600. That is, data is read from and written to NAND flash memory on a physical page basis. According to the present embodiment, the size of the physical page 600 is, for example, 16 clusters (4 kB×16 clusters=64 kB).

Figure 2B:
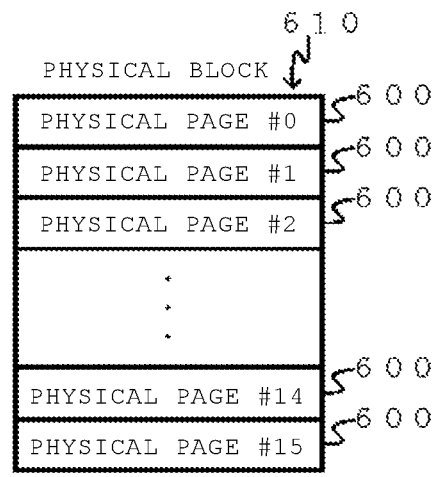

Furthermore, as illustrated in FIG. 2B, a minimum unit for data erasing from the NAND flash memory 20 is one physical block 610. That is, in the data erasing operation, data is erased on a per physical block basis and not on a per physical page basis. According to the present embodiment, the size of the physical block 610 is 256 clusters, that is, 16 physical pages (64 kB×16 physical pages=1024 kB). It is noted that a size of each of cluster, physical block and physical page units is but one example, and the sizes are not limited to the specific values described above.

Next, configurations of a logical page 700 and a logical block 710 are described with reference to FIGS. 3A and 3B.

Figure 3A:
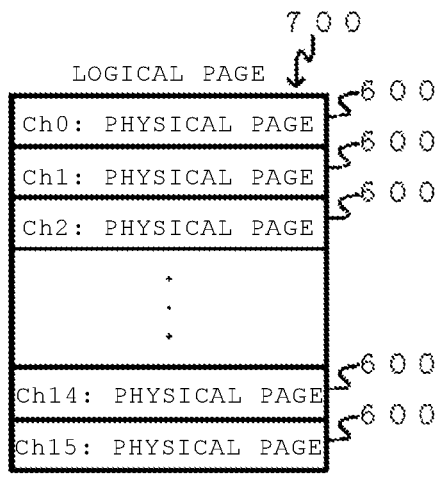
FIGS. 3A and 3B schematically illustrate configurations of a logical page and a logical block according to the first embodiment.
Figure 3B:
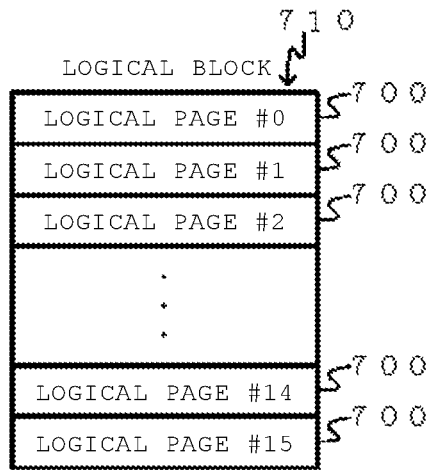

According to the present embodiment, as illustrated in FIG. 3A, a set including the physical pages 600 of their respective NAND flash memory groups Ch0 to Ch15, in each of which a parallel operation to each other can be performed, forms a logical page 700. The controller 10 controls the data write to the NAND flash memory 20 in units of one logical page 700. The controller 10 controls the data read from the NAND flash memory 20 in units of one cluster 620. Furthermore, as illustrated in FIG. 3B, the controller 10 controls the data erasing from the NAND flash memory 20 in units of one logical block 710, which corresponds to 16 logical pages 700 of data. That is, the controller 10 performs erasing processing on a per logical block 710 basis, and not on a per physical block 610 basis (that is, the minimum unit for data erasing of the storage device is one logical block 710).

Next, a thread 800 is described with reference to FIG. 4.

The memory controller 10 according to the present embodiment manages the path through which the write data pass before being written to the NAND flash memory 20, and the path is referred to as the thread 800. The thread 800 includes at least one or several portions of the buffer 210. A circuit that generates an error correction code and the like may be connected to the thread 800. According to the present embodiment, the maximum number m (where m is a natural number) of threads is 8. However, the maximum number of threads may be larger or smaller than 8. As the maximum number of threads increases, a circuit size of the memory controller 10 increases. Therefore, it is typically preferable that the maximum number of threads not be excessively large.

The write data received by the host IF control unit 100 are stored in the buffer 210 for each thread 800. The write data stored in the buffer 210 for each thread 800 are read by the buffer read control unit 320 and transferred to a NAND controller 310. The buffer read control unit 320 transfers each piece of write data to the NAND controller 310 in such a manner that pieces of write data which are stored in the buffer 210 for a plurality of threads 800 are written to one logical block 710. That is, the buffer management unit 200 stores write data that is to be written to one logical block 710 in one thread 800 of buffer 210.

Furthermore, the CPU 500 performs garbage collection on every thread 800 based on control of the FW. That is, when a logical block 710 that belongs to a certain thread 800 is selected as a garbage collection source block, the CPU 500 selects a garbage collection destination block from the logical blocks 710 that belong to the same thread 800. The logical block 710 that is the garbage collection source block is then used for a data write to the thread 800 after the data are erased.

The configuration of the semiconductor storage device 1 according to the present embodiment is described above. An outline of a stream data write will be described in the following.

Recently, in order to reduce the number of Program/Erase cycles of a nonvolatile semiconductor memory, a technique has been introduced, in which data having the same expected life cycle are handled as a set. That is, a set of data (which is hereinafter referred to as stream data) that is expected to be collectively invalidated by a host, is collectively written to the same memory block (which is the unit of erasing) in the nonvolatile semiconductor memory.

In order to invalidate certain data, the host (a) issues a write command that designates a logical address related to the certain data and transmits write data, (b) issues a command (for example, an UNMAP command that is stipulated in the SCSI specifications, or a TRIM command that is stipulated in the ATA specifications) that instructs the invalidation of the data, (c) issues a command (for example, a FORMAT UNIT command that is stipulated in the SCSI specifications) that provides an instruction to initialize all allocated areas of the storage device, or the like.

Figures 4, 5:
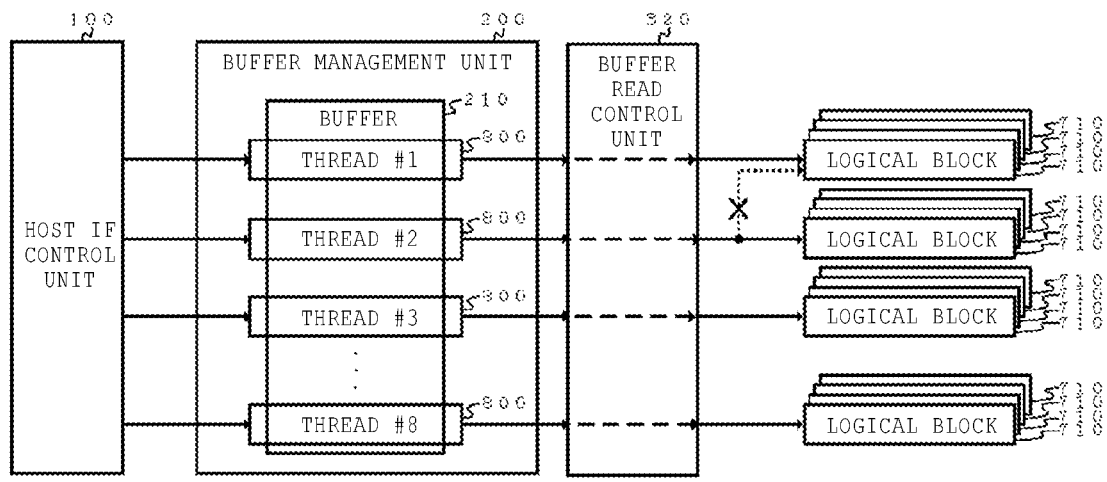
FIG. 4 is a block diagram for describing a thread according to the first embodiment.
FIG. 5 illustrates contents of a STREAM CONTROL command in the SCSI specifications.
Figures 6, 7:
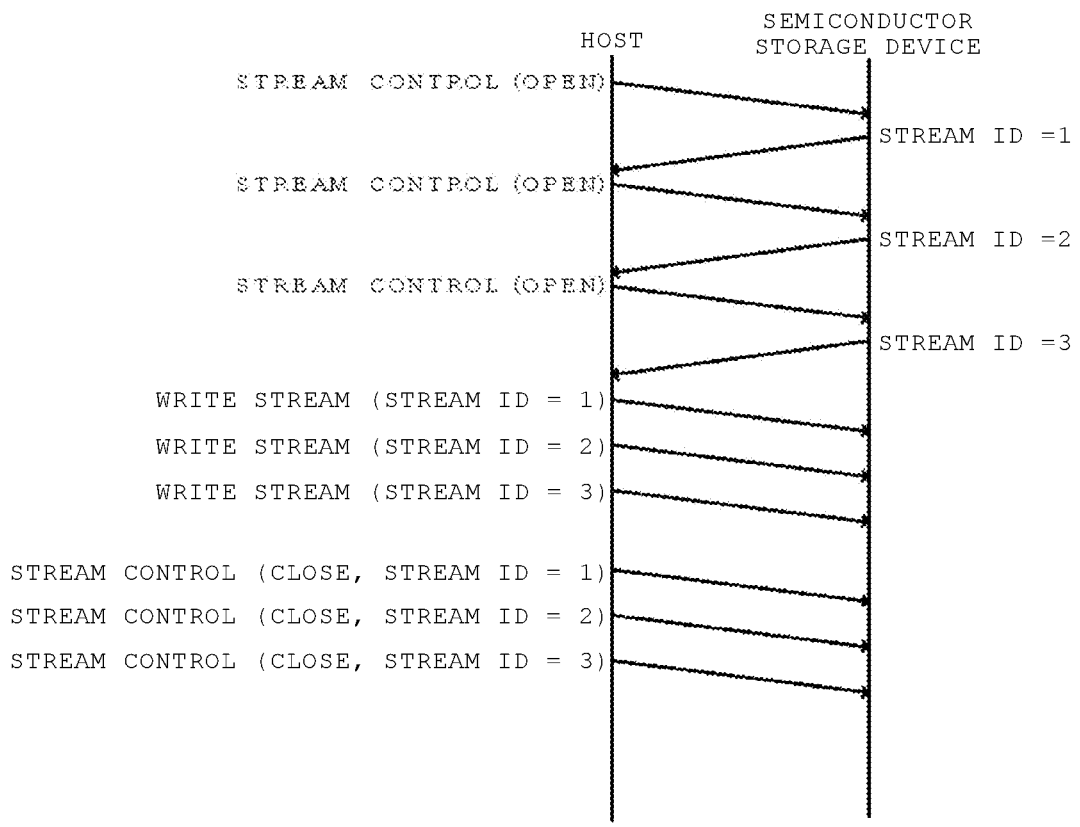
FIG. 6 illustrates contents of a WRITE STREAM command in the SCSI specifications.
FIG. 7 is a sequence diagram for transferring stream data in compliance with the SAS specifications.

FIGS. 5 and 6 illustrate contents of a command according to the SCSI specifications that include SAS specifications, which is used for the stream data write.

The STREAM CONTROL command illustrated in FIG. 5 is a command with which the host 2 requests to the semiconductor storage device 1 for assignment of an identifier for identifying each piece of stream data (referred to herein as a stream ID). The STREAM CONTROL command is also used in order for the host 2 to request to the semiconductor storage device 1 for releasing the stream ID that is no longer necessary.

STR_CTL field indicates which of the assignment (OPEN) of the stream ID and the releasing (CLOSE) of the stream ID the STREAM CONTROL command requests for. When STR_CTL field is 01b, this means an assignment request (OPEN). At this time, STR_ID field is a "don't care". On the other hand, when STR_CTL field is 10b, this means a releasing request (CLOSE). The stream ID that has to be released is designated in STR_ID field. The STREAM CONTROL command of which STR_CTL field is 01b is hereinafter expressed as the STREAM CONTROL (OPEN) command, and the STREAM CONTROL command of which STR_CTL field is 10b is hereinafter expressed as the STREAM CONTROL (CLOSE) command.

The WRITE STREAM command illustrated in FIG. 6 is a command that is used for the stream data write. The host 2 designates the stream ID that is assigned by the semiconductor storage device 1 in response to the STREAM CONTROL (OPEN) command, to STR_ID field, and issues the command to the semiconductor storage device 1.

Next, one example of a protocol in a case where the stream data is transferred in compliance with the SAS specifications is described with reference to FIG. 7. It is noted that, for simplification, a detailed description of some frames that are necessary for command execution in compliance with the SAS specifications, such as a XFER_RDY frame, a RESPONSE frame, a DATA frame, or the like is omitted.

First, host 2 issues a STREAM CONTROL (OPEN) command to request assignment of a stream ID. The semiconductor storage device 1 performs processing, such as allocating an available space in the buffer 210, and then notifies the host 2 that stream ID=1 is assigned. In the same manner, the semiconductor storage device 1 notifies the host 2 that stream IDs=2 and 3 are assigned.

The host 2 issues WRITE STREAM commands using the assigned stream IDs=1, 2, and 3, and transfers the stream data. The host 2 knows (or anticipates) a life cycle of each piece of stream data. The host 2 does not transfer pieces of data that have different life cycles using the same stream ID. For example, all pieces of stream data that are transferred with the WRITE STREAM command for stream ID=1, are expected to be collectively invalidated by host 2.

When the transfer of the stream data is completed, the host 2 issues STREAM CONTROL (CLOSE) commands to request for the releasing of stream IDs=1, 2, and 3 that are no longer necessary.

It is noted that the stream data may be transferred with a protocol other than the one described above. For example, a protocol may be employed in which a stream ID that has become unnecessary is not explicitly released.

Figure 8:
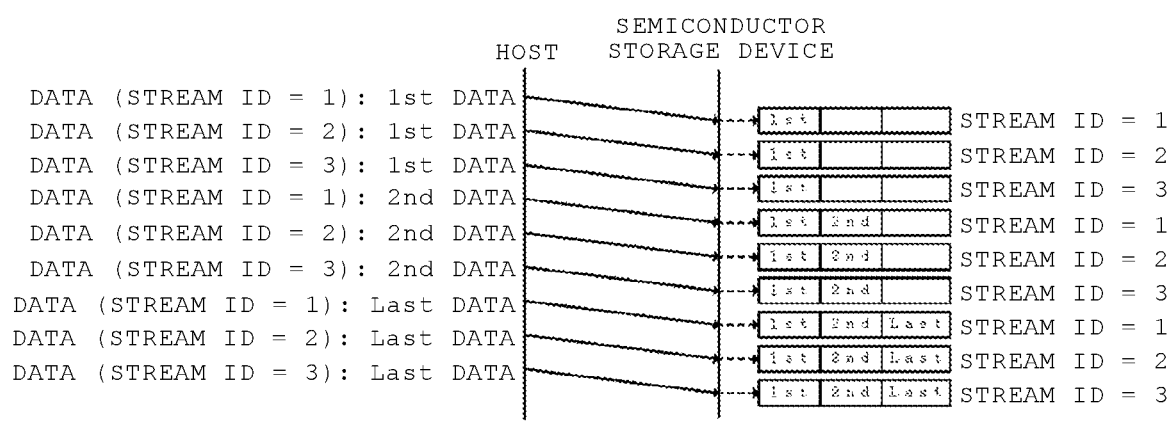
FIG. 8 is a sequence diagram for transferring a plurality of pieces of stream data in compliance with the SAS specifications.

Commands can be queued and are executed in compliance with the SAS specifications. One example of queuing is illustrated in FIG. 8. In FIG. 8, transfer of stream data that have the streaming IDs=1, 2, and 3 is performed and each piece of stream data is transferred with three DATA frames respectively. Here, before completing a transfer of stream data with a stream ID, another transfer of stream data with another stream ID may be carried out. For example, before completing the transfer of stream data of three frames with the stream ID=1, the stream data with the stream ID=2 or the stream ID=3 may be performed.

An outline of the stream data write has been described above. How the semiconductor storage device 1 according to the present embodiment writes the stream data to the NAND flash memory 20 will be described in the following.

Figure 9A:
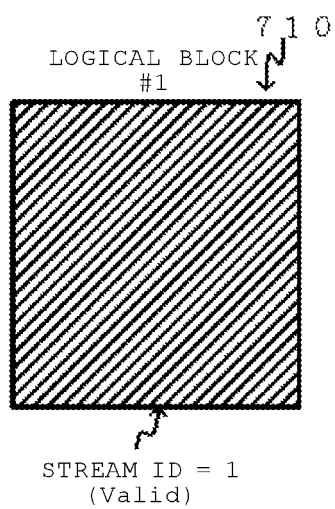
FIGS. 9A and 9B schematically illustrate a first example of writing stream data to a logical block according to the first embodiment.

FIG. 9A illustrates a state in which pieces of stream data that have the same stream ID are written in one logical block 710. The stream data that have stream ID=1 are written in a certain logical block 710 (which is defined as logical block #1).

Figure 9B:
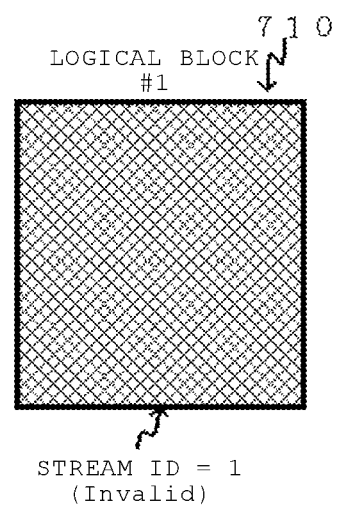

FIG. 9B illustrates a state after the state in FIG. 9A, when the host 2 has invalidated the stream data that have stream ID=1. As described above, the pieces of stream data that have the same stream ID are expected to be collectively invalidated by the host 2. The invalidation of the pieces of stream data that have stream ID=1 invalidates all data written in logical block #1. In this state, by erasing the logical block #1 without requiring garbage collection, the logical block #1 can be regarded as a free logical block. A free logical block does not contain any valid data and becomes an erased logical block by erasing.

Figure 10A:
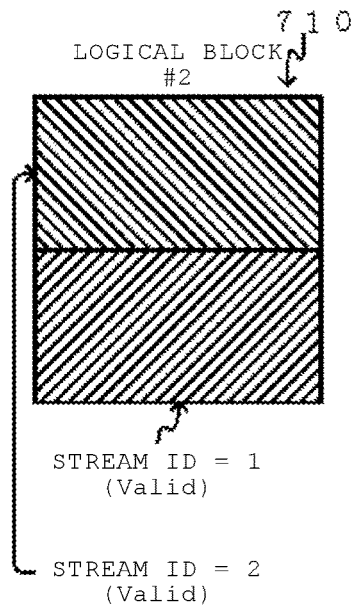
FIGS. 10A and 10B schematically illustrate a second example of writing the stream data to the logical block according to the first embodiment.

FIG. 10A illustrates a state in which pieces of stream data that have two different stream IDs are written mixed in one logical block 710. Here, stream data that have stream ID=1 and the stream data that have stream ID=2 are written in a certain logical block 710 (which is defined as logical block #2).

Figure 10B:
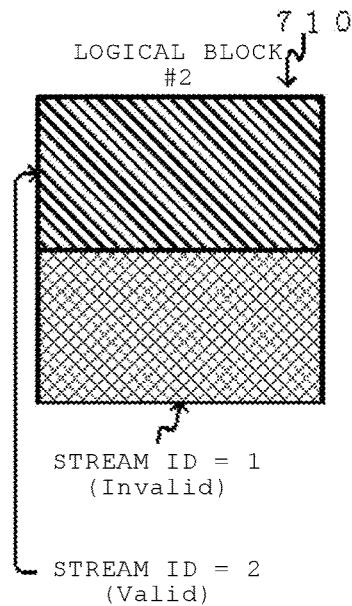

FIG. 10B illustrates a state after the state in FIG. 10A, when the host 2 has invalidated the stream data that have stream ID=1. The invalidation of the stream data that have stream ID=1 invalidates the stream data that have stream ID=1 among pieces of data that are written in logical block #2. However, the stream data that have stream ID=2 have not been invalidated. In this state, the stream data that have the stream ID=2, which are still valid among pieces of data that were written in logical block #2, must be copied to a different logical block 710 (for example, a logical block #3 that is not specifically illustrated) before regarding logical block #2 as a free logical block (that is, the garbage collection must be completed), and then erasing data from logical block #2 can be performed.

When the stream data are written in the NAND flash memory 20 as illustrated in FIG. 10A, a total amount of data that must be written in the NAND flash memory 20 for obtaining the free logical block is larger than that in the case in FIG. 9A. That is, the write amplification factor (WAF) is larger.

Figure 11A:
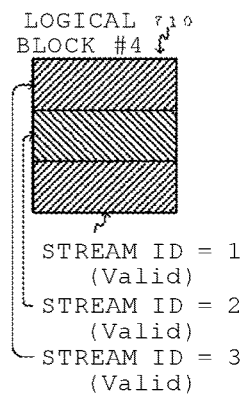
FIGS. 11A to 11D schematically illustrate a third example of writing the stream data to the logical block according to the first embodiment.

FIG. 11A illustrates a state in which pieces of stream data that have three stream IDs are written in one logical block 710. The stream data that have stream ID=1, the stream data that have stream ID=2, and the stream data that have stream ID=3 are written in a certain logical block 710 (which is defined as logical block #4).

Figure 11B:
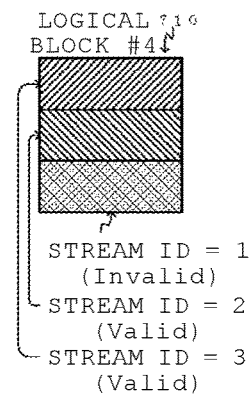

FIG. 11B illustrates a state after the state in FIG. 11A, when the host 2 has invalidated the stream data that have stream ID=1. The invalidation of the stream data that have stream ID=1 invalidates the stream data that have stream ID=1 among pieces of data that are written in logical block #4. However, the stream data that have stream ID=2 and the stream data that have stream ID=3 are not invalidated. In this state, the stream data that have the stream ID=2 and stream data that have stream ID=3, which are still valid among pieces of data that are written in logical block #4, have to be copied to a different logical block 710 (for example, logical block #5) (that is, after the garbage collection is performed) before erasing data from logical block #4 is performed.

Figure 11C:
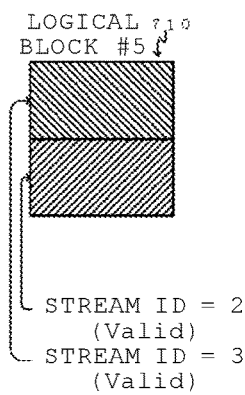

FIG. 11C illustrates a state after, as described above, the stream data that have stream ID=2 and the stream data that have stream ID=3 are written to logical block #5 by the garbage collection.

Figure 11D:
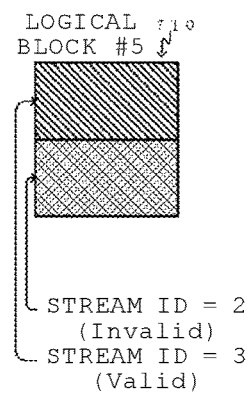

FIG. 11D illustrates a state after the host 2 has invalidated the stream data that have stream ID=2 after the state in FIG. 11C. The stream data that have stream ID=2 among pieces of data that have been written in logical block #5 are invalidated. However, the stream data that have stream ID=3 are not invalidated. To set logical block #5 as a free logical block, the stream data that have the stream ID=3 in logical block #5, have to be copied to a different logical block 710 (for example, a logical block #6 that is not illustrated) (that is, the garbage collection is performed), and then erasing data from logical block #5 can be performed.

When the stream data are written in the NAND flash memory 20 as illustrated in FIG. 11A or FIG. 11C, the erasing process for a logical block requires copying of data to a different logical block, so a total amount of data that has to be written (or copied) in the NAND flash memory 20 is larger more than in the case in FIG. 10A. That is, the WAF is larger.

As described above, when the pieces of stream data that have more than one stream IDs are written in one logical block 710, the WAF increases with the increase in the number of different stream IDs of the pieces of stream data that are written in said one logical block 710.

This outcome is described with reference to FIGS. 12A and 12B. In a case where only pieces of stream data that have one stream ID are written in one logical block 710 the WAF is one, because the logical block 710 can be simply be designated as a free logical block without the need of performing the garbage collection. However, when the pieces of stream data written in one logical block 710 have a plurality of stream IDs, garbage collection has to be performed to regard the logical block 710 to be a free logical block. Therefore, the WAF increases.

Figure 12A:
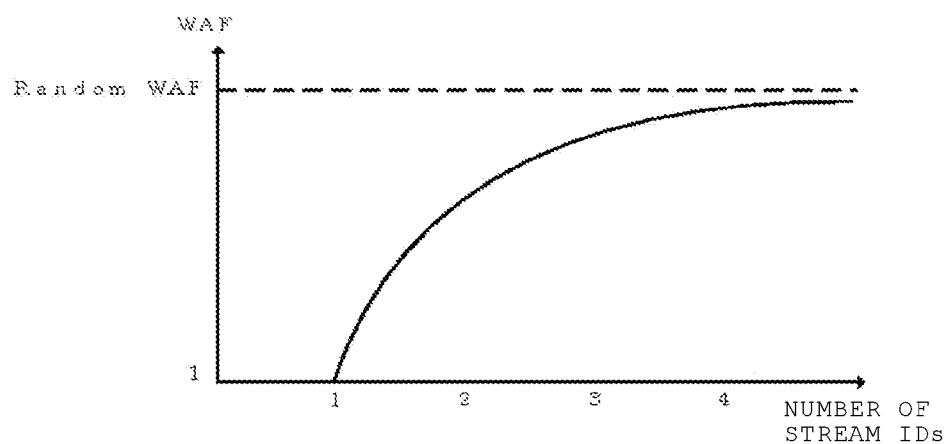
FIGS. 12A and 12B are graphs for describing a WAF according to the first embodiment.

As illustrated in FIG. 12A, the WAF increases with the increase in the number of the stream IDs of the pieces of stream data that are written in one logical block 710, and approaches a random WAF level. The random WAF here is the WAF when it is assumed that pieces of completely random data, that is, pieces of data that are invalidated at different points in time, are written in one logical block 710.

It is noted that a value of the WAF in the case where the pieces of stream data that have a plurality of stream IDs are written in one logical block 710 changes according to a ratio of an overprovisioning capacity to a user capacity (an OP ratio). The user capacity is the memory storage capacity that corresponds to an address range that is able to be designated by the host 2. The overprovisioning capacity is the difference between the user capacity and the physical capacity that is the actual memory capacity of the NAND flash memory 20.

Figure 12B:
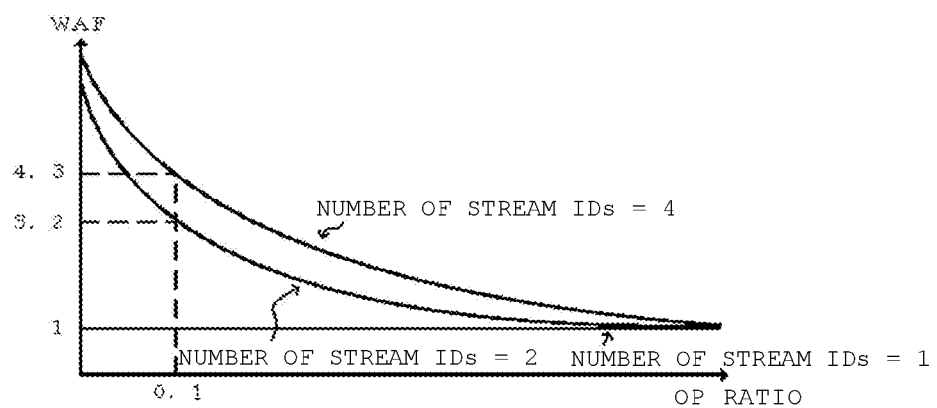

In FIG. 12B, the WAF is illustrated along the vertical axis and the OP ratio along the horizontal axis. As illustrated in FIG. 12B, although the same OP ratio applies, the WAF increases as the number of stream IDs that are written in one logical block 710 increases. Furthermore, in a case where the numbers of stream IDs that are written in one logical block 710 are the same, the WAF decreases as the OP ratio increases. For example, in a case where the OP ratio is 0.1, the WAF is approximately 3.2 when pieces of stream data that have two stream IDs are written in one logical block 710. And when pieces of stream data that have four stream IDs are written in one logical block 710 and the OP ratio remains 0.1, the WAF is approximately 4.3. It is noted that, as described above, the WAF is 1 regardless of the OP ratio when only pieces of stream data that have the same stream ID are written in one logical block 710.

According to the present embodiment, the WAF for every thread 800 (a "local WAF" or a "thread WAF") is defined by the following equation:

local WAF=(a total amount of write data received from host 2 for a certain thread 800+a total amount of write data in response to garbage collection to the certain thread 800)/(the total amount of write data received from the host 2 for the certain thread 800)   Equation (2)

Furthermore, the WAF of the entire semiconductor storage device 1 (a "device WAF" or a "total WAF") is expressed (Equation (3)) using the local WAF as follows:

device WAF=Σβi×local WAF i   Equation (3)

In Equation (3) i is the number (i=1 to 8 according to the present embodiment) of the thread 800, local WAF i is a local WAF for thread #i, and βi is a coefficient for every thread 800. The coefficient βi may be expressed (Equation (4)) as follows:

βi=(a throughput at which write data that is received from the host 2 is written to the NAND flash memory 20 via thread #i)/(a throughput at which all pieces of write data received from the host 2 are written to the NAND flash memory 20)   Equation(4)

(The write data shown here does not contain the one written by the garbage collection process.)

The throughput and the total amount of pieces of write data that are written to the NAND flash memory 20 per unit time are proportional to each other. The throughput here is a throughput of data transfer between the host 2 and the semiconductor storage device 1. The throughput is hereinafter referred to as a host throughput.

Next, an example of allocation of the threads 800 by the stream/thread conversion unit 230 according to the present embodiment is described with reference to FIG. 13. For simplification, it is assumed here that the semiconductor storage device 1 has a maximum of four threads 800. As described in FIG. 12B, the WAF is assumed to be 3.2 when pieces of stream data that have two stream IDs are written to one logical block 710. As described above, the WAF is assumed to be one when only pieces of stream data that have one stream ID are written to one logical block 710.

Five pieces of stream data that have the stream IDs=1 to 5 are transmitted from the host 2. Host throughputs of the stream data that have stream ID=1, the stream data that have stream ID=2, the stream data that have stream ID=3, the stream data that have stream ID=4, and the stream data that have stream ID=5 are 1200 MB/s, 1100 MB/s, 1000 MB/s, 500 MB/s, and 400 MB/s, respectively. A method of calculating the host throughput will be described below.

The stream/thread conversion unit 230 stores the five pieces of stream data that have stream IDs=1 to 5 in the buffers 210 of four threads 800 (thread #1 to thread #4). This is hereinafter expressed as, for example, stream ID=1 is allocated to thread #1. As described above, it is not preferable that the total number of threads increases excessively. According to the present embodiment, when the total number of stream IDs is larger than the number of available threads, then allocation of the threads is performed as in the following.

The stream/thread conversion unit 230 prioritizes the allocation of threads to the stream ID that has a high host throughput. That is, here stream IDs=1, 2, and 3 are allocated to thread #1, thread #2, and thread #3, respectively. Furthermore, stream IDs=4 and 5 that have a low host throughput are allocated to thread #4 in a mixed/joint manner.

As described above, the WAF is one when pieces of stream data that have one stream ID are written to just one logical block 710. Therefore, the local WAFs of thread #1, thread #2, and thread #3 are 1.

Furthermore, when it comes to βi, according to Equation (4), then β1=1200/(1200+1100+1000+500+400)=0.286, β2=1100/(1200+1100+1000+500+400)=0.262, and β3=1000/(1200+1100+1000+500+400)=0.238.

On the other hand, the WAF is 3.2 when pieces of stream data that have two stream IDs are written to one logical block 710. Therefore, the local WAF of thread #4 is 3.2. When it comes to β4, because the host throughput of the stream data that are stored in the buffer 210 of thread #4 is 500 MB/s (stream ID=4)+400 MB/s (stream ID=5)=900 MB/s, β4=900/(1200+1100+1000+500+400)=0.214 according to Equation (4).

Figure 13:
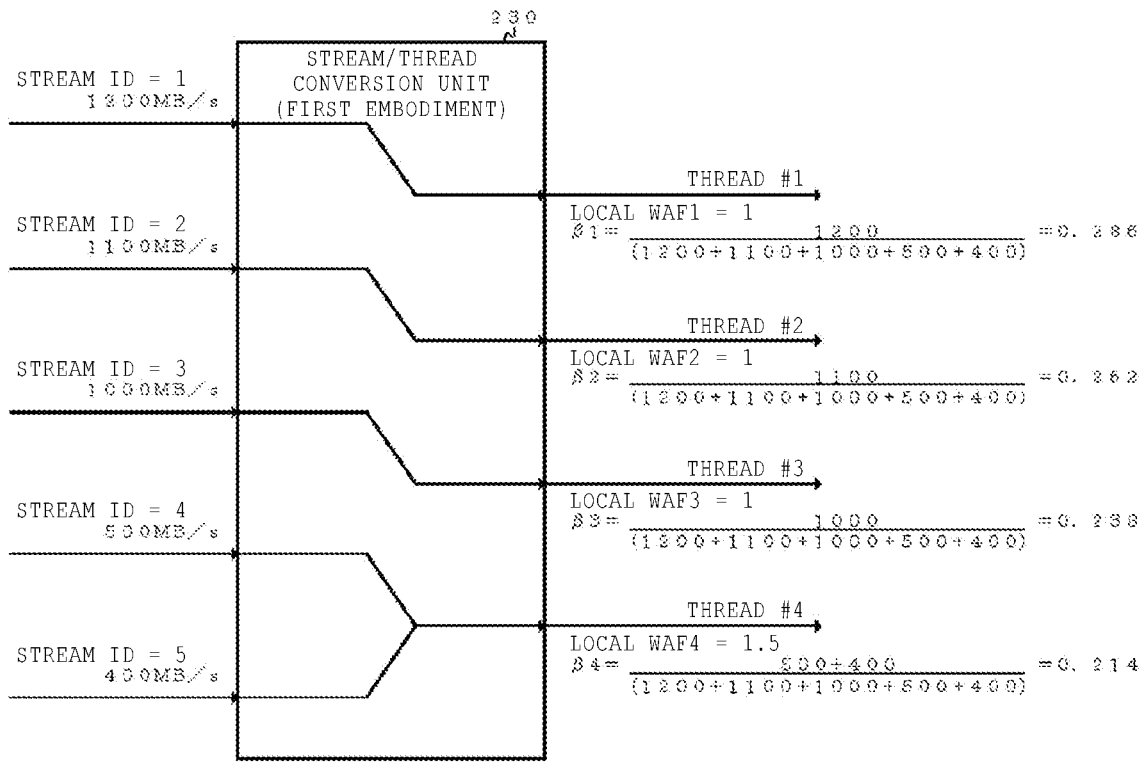
FIG. 13 illustrates an example of thread allocation according to the first embodiment.

Therefore, when it comes to the device WAF when the stream IDs are allocated to the threads as illustrated in FIG. 13, the device WAF=0.286×1+0.262×1+0.238×1+0.214× 3.2=1.47 according to Equation (3).

Figure 14:
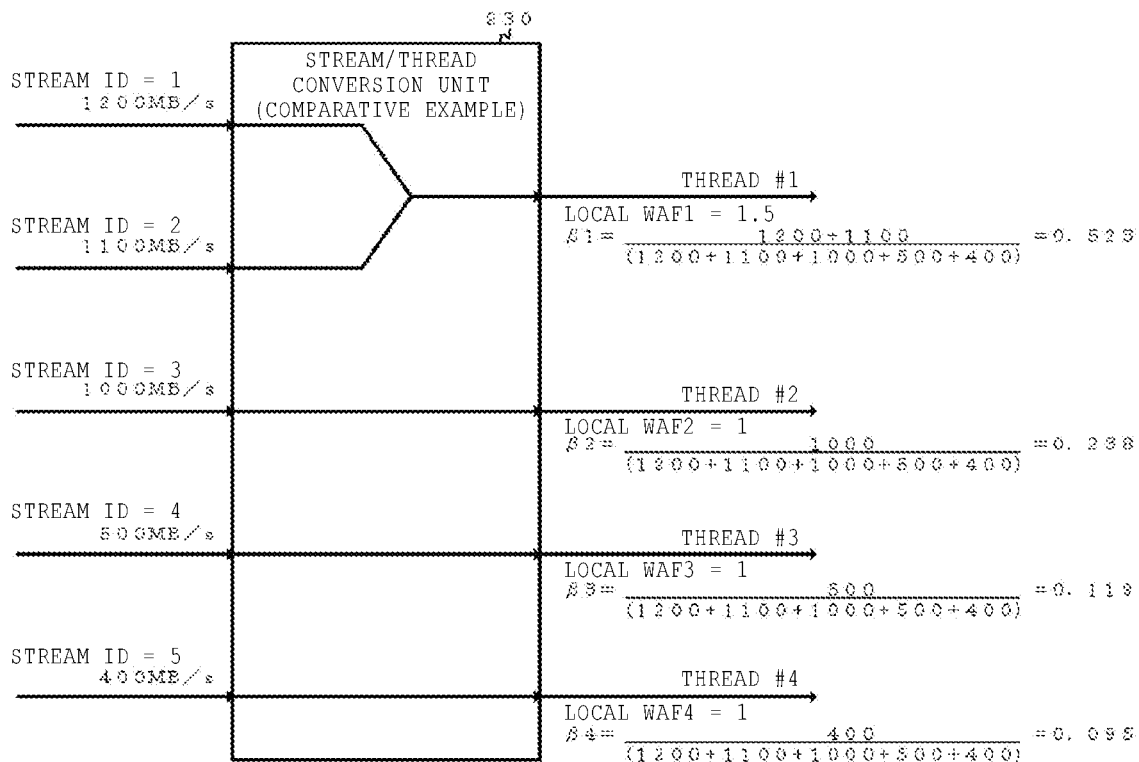
FIG. 14 illustrates an example of thread allocation according to a comparative example.

Next, an example of allocation of threads 800 by a stream/thread conversion unit 230 according to a comparative example is described with reference to FIG. 14.

The host throughput of the stream data transmitted from the host 2 is the same as in the case in FIG. 13. However, here the stream/thread conversion unit 230 in the comparative example allocates stream IDs=1 and 2 that have the highest host throughputs to thread #1 in a mixed/joint manner. Furthermore, the stream/thread conversion unit 230 in the comparative example allocates stream IDs=3, 4, and 5 that have lower host throughputs to thread #2, thread #3, and thread #4, respectively. As a result of allocating the stream IDs to the threads 800 in this manner, when it comes to βi, β1=2200/(1200+1100+1000+500+400)=0.523, β2= 1000/(1200+1100+1000+500+400)=0.238, β3=500/(1200+ 1100+1000+500+400)=0.119, and β4=400/(1200+1100+ 1000+500+400)=0.095. Therefore, in the comparative example, the device WAF=0.523×3.2+0.238×1+0.119×1+ 0.095×1=2.13. Thus, it can be understood that the device WAF is larger than in the case according to the present embodiment. Therefore, allocating the threads suitably is important to minimize the device WAF.

Next, a configuration of the stream control unit 220 according to the present embodiment is described in detail with reference to FIG. 15.

The stream control unit 220 includes a stream ID management table 222 for managing the stream IDs that are assigned to the host 2. The stream ID management table 222 in FIG. 15 has a stream ID column, an open flag column, and an active flag column. According to the present embodiment, stream IDs=1 to 16 can be assigned to the host 2.

When receiving the STREAM CONTROL (OPEN) command from the host 2, the CPU 500 searches for the stream IDs that are available for assignment according to the stream ID management table 222, based on the control in accordance with the FW. The CPU 500 controls the host IF control unit 100 in such a manner that the allocated stream ID (which is hereinafter referred to as an open stream ID) is notified to the host 2. At this time, the CPU 500 sets the open flag in the stream ID management table 222 for the stream ID.

Furthermore, when the stream data start to be transferred from the host 2, the host IF control unit 100 reads a header of a DATA frame and notifies the stream control unit 220 of a stream ID of each piece of stream data (that is, a stream ID of the stream data that actually start to be transferred from the host 2, which is hereinafter referred to as an active stream ID).

Upon being notified of the active stream ID, the stream control unit 220 sets the active flag in the stream ID management table 222 for the stream ID.

After the transfer of the stream data is completed, when the host 2 issues the STREAM CONTROL (CLOSE) COMMAND to request for the releasing of the stream. ID that is no longer necessary, the CPU 500 clears the open flag and the active flag in the stream ID management table 222 for the stream ID.

Figure 15:
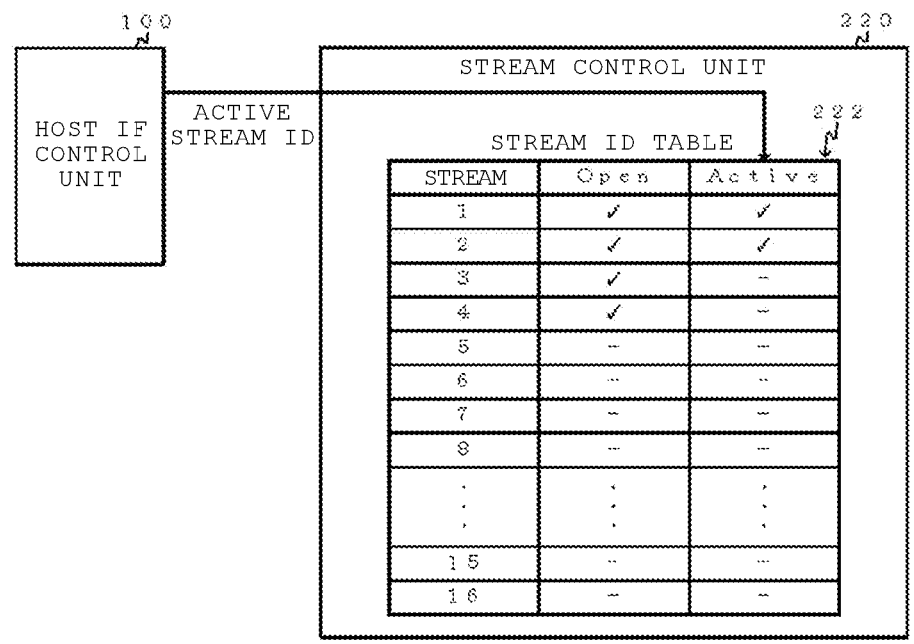
FIG. 15 illustrates a configuration of a stream control unit according to the first embodiment.

In FIG. 15, the assignment of stream IDs=1, 2, 3, and 4 to the host 2 is completed, and the stream data start to be transferred for the stream IDs=1 and 2.

Figure 16:
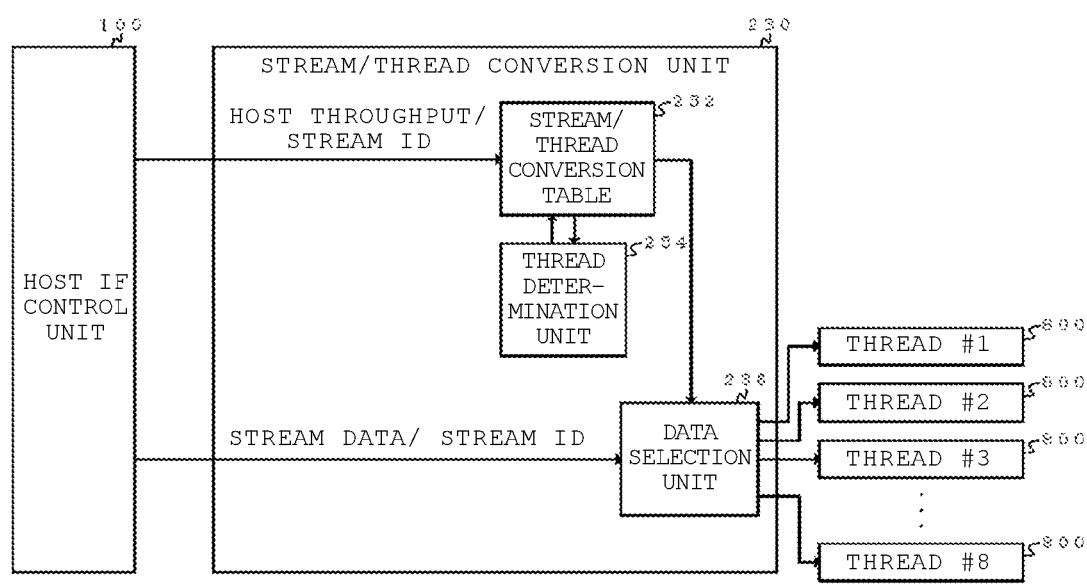
FIG. 16 is a block diagram for describing a configuration of a stream/thread conversion unit according to the first embodiment.

Next, a configuration of the stream/thread conversion unit 230 according to the present embodiment is described with reference to FIGS. 16 and 17. FIG. 16 is a block diagram of the stream/thread conversion unit 230. FIG. 17 illustrates a configuration of stream/thread conversion table 232 that the stream/thread conversion unit 230 includes. The stream/thread conversion table 232 has entries of which the number (16 according to the present embodiment) is the same as that of stream IDs that is can be assigned to the host 2. Each entry in the stream/thread conversion table 232 includes a stream ID, a host throughput, a priority level, and a thread ID.

As illustrated in FIG. 16, a host throughput for every stream ID is input into the stream/thread conversion unit 230 from the host IF control unit 100. A method of calculating the host throughput will be described later, but the calculation may be performed either of when the stream ID is initially assigned to the host 2 or when the stream data actually start to be transferred from the host 2.

The stream/thread conversion unit 230 stores the host throughput that is input from the host IF control unit 100 in the stream/thread conversion table 232. The thread determination unit 234 determines a priority level of each stream ID from the host throughput that is stored in the stream/thread conversion table 232. Furthermore, the thread determination unit 234 determines which thread is allocated to each stream ID. The thread determination unit 234 stores the priority level and the thread ID in the stream/thread conversion table 232.

The thread determination unit 234, in general, determines that the stream IDs that have the higher host throughput have the higher priority levels. In a case where a plurality of stream IDs that are equal in the host throughput, the priority level of the stream ID having smaller ID number may be higher.

The thread determination unit 234 allocates the stream IDs from a first ranked priority level to a (m−n)-th ranked priority level (where m is the maximum number of threads and n is a natural number that is equal to or greater than one and less than m) to thread #1 to thread #(m−n), respectively. The threads to which the stream IDs from the first ranked priority level to the (m−n)-th ranked priority level are allocated are hereinafter referred to as dedicated threads.

The thread determination unit 234 allocates the stream IDs that have the (m−n+1)-th ranked priority level or lower, to thread #(m−n+1) to thread #m. The thread to which the stream IDs that have the (m−n+1)-th ranked priority level or lower are allocated is hereinafter referred to as a mixing thread. In a case where there is a plurality of mixing threads, that is, in a case where n 2, the numbers of stream IDs that are allocated to each mixing thread need not be the same.

In a case where it is assumed that m=8 and n=1, thread #1 to thread #7 are the dedicated threads, and thread #8 is the mixing thread.

It is noted that an ID of a thread that is used as a dedicated thread may be other than #1 to #(m−n). An ID of a thread that is used as a mixing thread may be other than #(m−n+1) to #m.

The host IF control unit 100 causes the stream/thread conversion unit 230 to receive the stream data and to be notified of the stream. ID of the stream data. A data selection unit 236 searches the stream/thread conversion table 232 with the notified stream ID as an index, and selects which thread 800 the stream data are transferred to.

FIG. 17 illustrates one example of information that is stored in the stream/thread conversion table 232. At this point, it is assumed that n=1.

Host throughputs of the stream data that have stream ID=1, the stream data that have stream ID=2, the stream data that have stream ID=3, the stream data that have stream ID=4, the stream data that have stream ID=5, the stream data that have stream ID=6, the stream data that have stream ID=7, and the stream data that have stream IDs=8 to 16 are 1200 MB/s, 1100 MB/s, 1050 MB/s, 1000 MB/s, 950 MB/s, 900 MB/s, 850 MB/s, and 100 MB/s, respectively.

Priority levels of the stream IDs are determined in descending order of the host throughputs. Stream IDs=1 to 7 that have first to seventh ranked priority levels are allocated to thread #1 to thread #7, respectively, all of which are the dedicated threads. Stream IDs=8 to 16 that have eighth to sixteenth ranked priority levels are collectively allocated to thread #8, which is the mixing thread.

Figure 18:
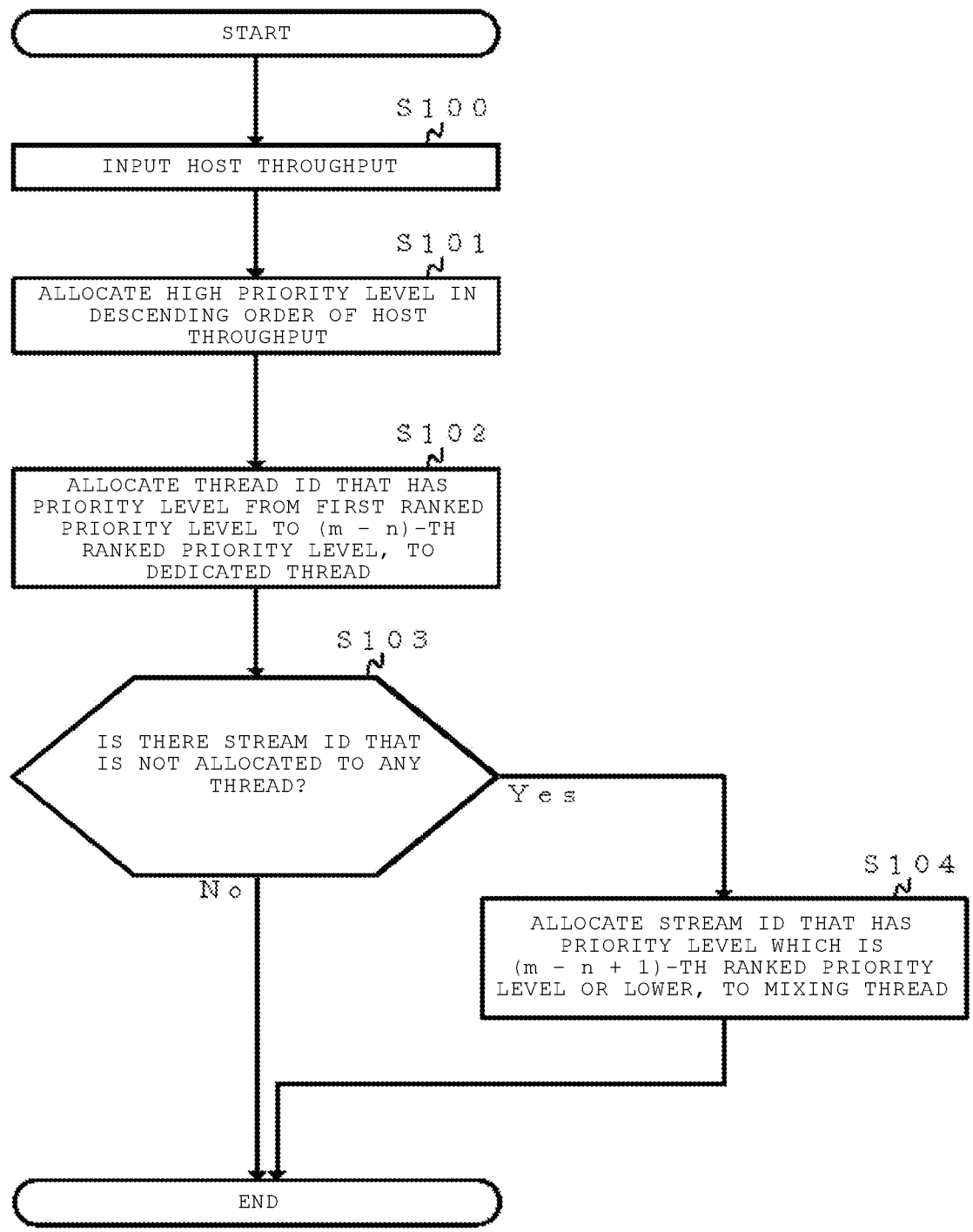
FIG. 18 is a flowchart for an operation by a thread determination unit according to the first embodiment.

Next, an operation by the thread determination unit 234, of performing thread allocation is described with reference to FIG. 18.

When the host throughput is input from the host IF control unit 100 (S100), the thread determination unit 234 performs allocation in such a manner that the higher the host throughput, the higher priority level that is allocated (S101). The thread determination unit 234 allocates the stream IDs from the first ranked priority level to the (m−n)-th ranked priority level to the dedicated threads (S102). In a case where there is a stream ID to which no thread is not allocated (Yes in S103), the thread determination unit 234 allocates the stream ID that has the (m−n+1)-th ranked priority level or lower, to the mixing thread (S104).

It is noted that thread determination unit 234 allocates the write data to which a stream ID has not been assigned (that is, the write data that are not stream data) to the mixing thread.

The semiconductor storage device 1 according to the present embodiment writes the stream data to the NAND flash memory 20 as described above.

Figure 19:
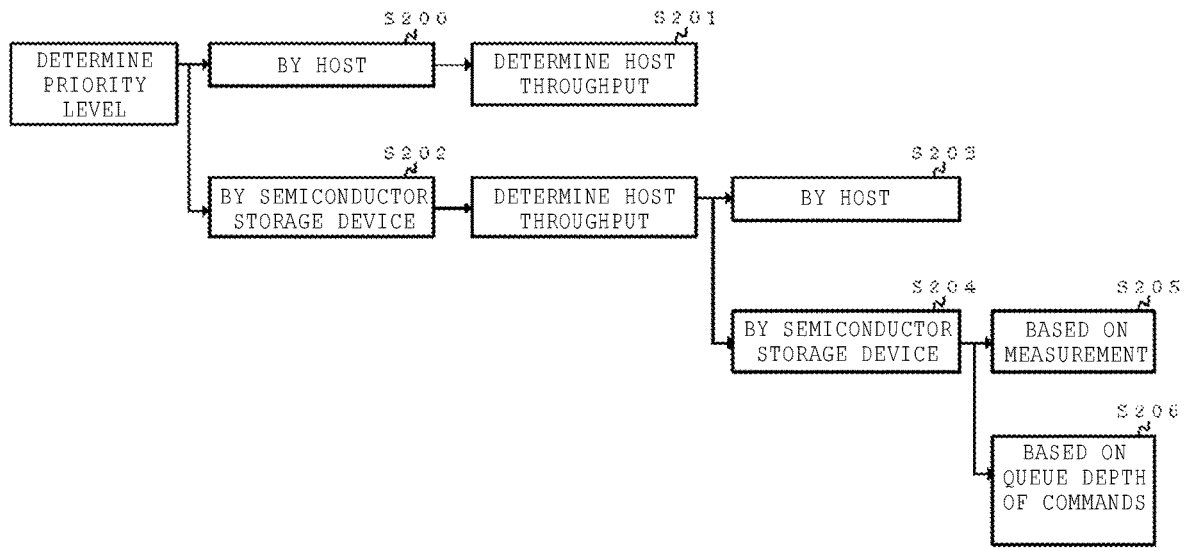
FIG. 19 is a flow diagram of a method of determining a priority level according to the first embodiment.

Next, variations of method for determining the priority level of every stream ID is described with reference to FIG. 19.

Determination (setting) of the priority level can be performed by the host 2 or the semiconductor storage device 1.

In a case where the host 2 determines the priority level (S200), the host 2 measures a host throughput between the host 2 and the semiconductor storage device 1 (S201) and determines the priority level. The determined priority level is notified to the semiconductor storage device 1, for example, with the STREAM CONTROL (OPEN) command. It is noted that, in this case, processing in each of S100 and S101 in FIG. 18 is skipped.

In a case where the semiconductor storage device 1 determines the priority level (S202), the semiconductor storage device 1 determines the priority level based on the host throughput. In this case, determination of the host throughput can be performed by the host 2 or the semiconductor storage device 1.

In a case where the host 2 determines the host throughput (S203), the host 2 measures the throughput between the host 2 and the semiconductor storage device 1, and determines the host throughput. The present step is the same as S201. The determined host throughput is notified to the semiconductor storage device 1, for example, by the STREAM CONTROL (OPEN) command. Then, the semiconductor storage device 1 determines the priority level based on the notified host throughput.

In a case where the semiconductor storage device 1 determines the host throughput (S204), a method that uses actual measurement (S205) or a method that uses a queue depth of the commands (S206) is used.

In a case where the method that uses the actual measurement is employed (S205), the semiconductor storage device 1 may determine the host throughput, for example, according to the number of WRITE STREAM commands that are completed within a past fixed period of time (which is defined as time period T1). In this case, a data transfer length for every WRITE STREAM command may be taken into account. Specifically, the throughput may be determined by dividing by time period T1 a sum of data lengths transferred with the WRITE STREAM commands within time period T1.

In a case where the method that uses the queue depth of the commands is used (S206), the host throughput cannot be determined precisely, but the semiconductor storage device 1 determines the host throughput from an estimation as will be described below. That is, for example, the semiconductor storage device 1 estimates the host throughput based on the number of WRITE STREAM commands that are queued in the command queue 120 at certain time point T2. Also in this case, the data transfer length for every WRITE STREAM command may be taken into account. Specifically, the host throughput is estimated based on a sum of data lengths that have to be transferred with the WRITE STREAM commands which are queued in the command queue 120 at time point T2.

Then, the semiconductor storage device 1 determines the priority level based on the host throughput determined by the semiconductor storage device 1 itself.

According to the semiconductor storage device according to the first embodiment, as described above, because a dedicated thread is allocated with higher priority to a stream ID that has a higher host throughput, the WAF of the semiconductor storage device can be reduced.

Second Embodiment

In the semiconductor storage device according to the first embodiment, in general, a higher priority level is allocated to the stream. IDs that have a higher host throughput, and available threads are allocated according to the priority level. In contrast, in a semiconductor storage device according to the second embodiment, the allocation of the threads can be arranged based on the sequentiality of the pieces of data in the stream data. According to the second embodiment, an attempt is made to allocate the threads more suitably based on the assumption that sequential pieces of data will be collectively invalidated in a high probability (for example, in a case where the data constitutes portions of the same file) even in a case where pieces of stream data that are transferred using the same stream ID may not be collectively invalidated.

Figure 20A:
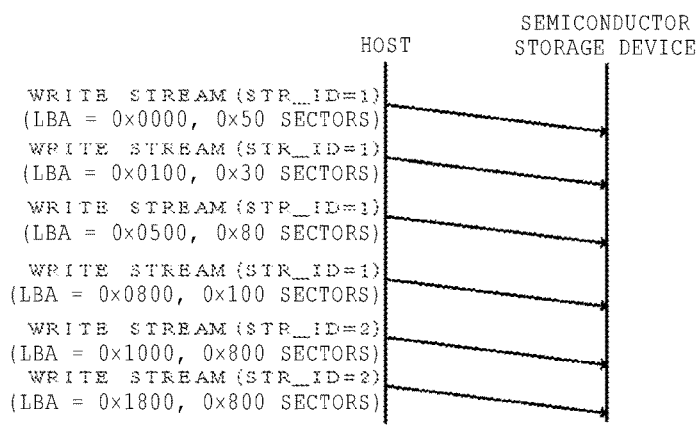
FIGS. 20A and 20B schematically illustrate a state when a plurality of WRITE STREAM commands in the SCSI specifications is issued.

FIG. 20A is a sequence diagram for describing one example in which the host 2 issues a plurality of WRITE STREAM commands using the stream ID.

Using the stream ID=1, the host 2 issues each of four WRITE STREAM commands, the transfer length=0x50 sectors from start LBA=0x0000, the transfer length=0x30 sectors from start LBA=0x0100, the transfer length=0x80 sectors from start LBA=0x0500, and the transfer length=0x100 sectors from start LBA=0x0800.

Furthermore, using the stream ID=2, the host 2 issues each of two WRITE STREAM commands, the transfer length=0x800 sectors from start LBA=0x1000, and the transfer length=0x800 sectors from start LBA=0x1800.

Figure 20B:
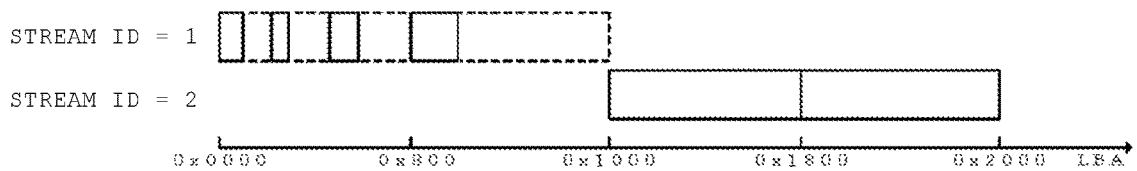

LBAs of the stream data that are transmitted from the host 2 at this time are as illustrated in FIG. 20B. A solid line portion of FIG. 20B illustrates LBA ranges in which the stream data are transmitted. A dotted line portion of FIG. 20B illustrates LBA ranges in which the stream data are not transmitted. The stream data that have stream ID=1 have low sequentiality (or high randomness), and the stream data that have stream ID=2 have high sequentiality. Here, "sequentiality" refers to a degree of contiguity among logical addresses of neighboring commands in sequence in the data stream. A sequential access pattern, in which logical addresses of commands are contiguous, has a high sequentiality. A random access pattern, in which logical addresses of commands are random, has a low sequentiality.

Figure 21A:
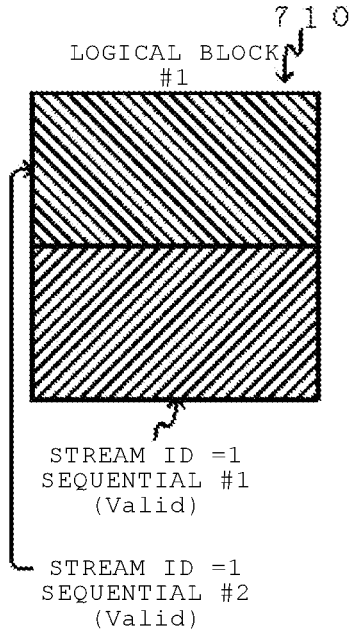
FIGS. 21A and 21B illustrate an example of writing stream data to a logical block according to a second embodiment.

FIG. 21A illustrates a state in which two pieces of sequential data that have the same stream ID are written in one logical block 710. Stream data that have stream ID=1·sequential #1 (for example, LBA=0x0000 to 0x1000) and stream data that have stream ID=1·sequential #2 (for example, LBA=0x2000 to 0x3000) are written in a certain logical block 710 (which is defined as logical block #1).

Figure 21B:
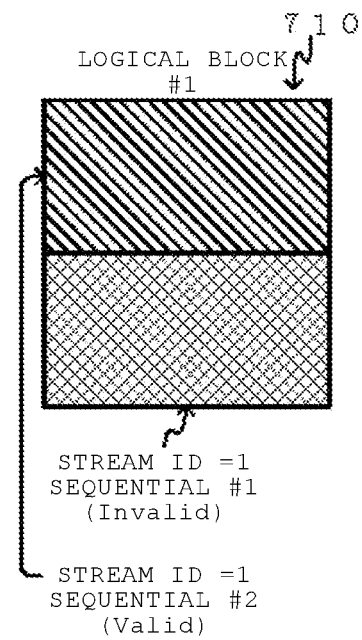

FIG. 21B illustrates a state after the state in FIG. 21A, the host 2 invalidates the stream data that have stream ID=1·sequential #1. Invalidation of the stream data that have stream ID=1·sequential #1 invalidates the stream data among pieces of data that are written in logical block #1. However, stream data that have stream ID=1·sequential #2 are not invalidated. In this state, the stream data that have stream ID=1·sequential #2, which are still valid among pieces of data that are written in logical block #1, should be copied to a different logical block 710 (for example, logical block #2 that is not illustrated) (that is, the garbage collection is required), before erasing logical block #1.

Therefore, when FIGS. 10A and 10B (describing aspects of first embodiment) and FIGS. 21A and 21B (describing aspects of the second embodiment) are compared, in FIGS. 21A and 21B, a total amount of data that should be written to the NAND flash memory 20 increases to obtain the same number of free logical blocks. That is, stream data that have low sequentiality increases the WAF.

Next, an example of the allocation of the thread 800 by the stream/thread conversion unit 230 according to the second embodiment is described with reference to FIGS. 22 to 24.

Figure 22:
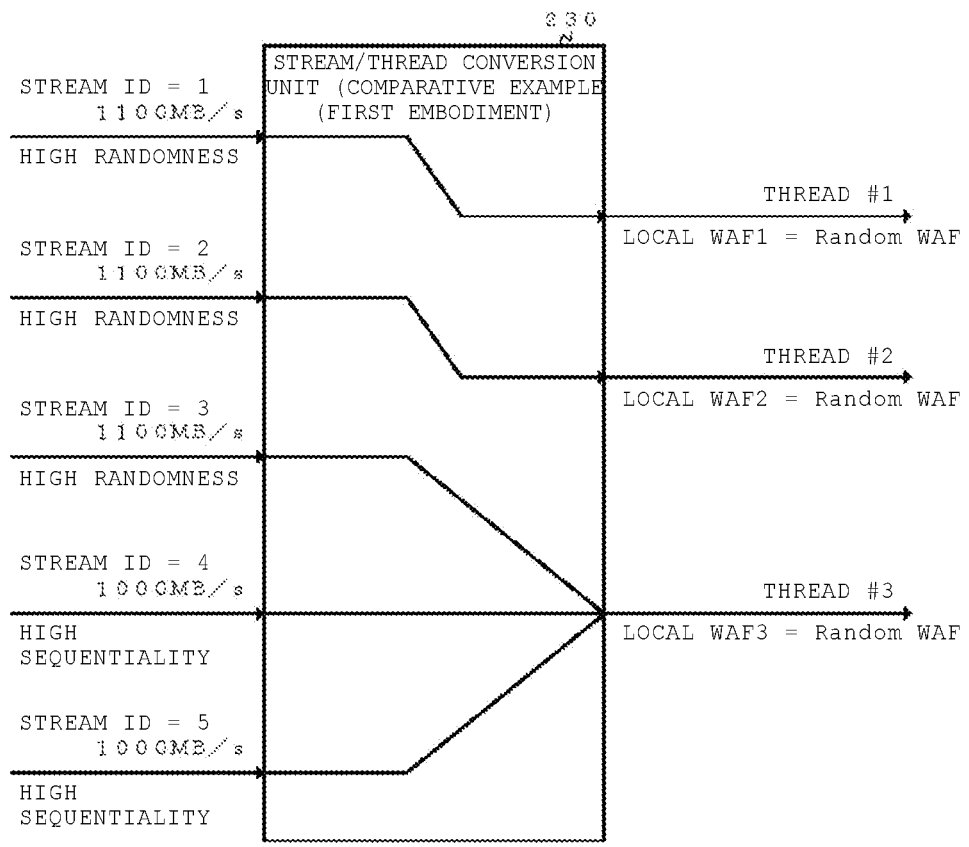
FIG. 22 illustrates an example of the thread allocation according to the comparative example.

As illustrated in FIG. 22, it is assumed that five pieces of stream data that have stream IDs 1 to 5 are transmitted from the host 2. Host throughputs of pieces of stream data that have stream IDs=1 to 3 and pieces of stream data that have stream IDs=4 and 5 are 1100 MB/s and 1000 MB/s, respectively. It is assumed that the pieces of stream data that have stream IDs=1 to 3 have high randomness, and the pieces of stream data that have stream IDs 4 to 5 have high sequentiality. It is assumed here that the semiconductor storage device 1 has a maximum of three threads 800.

At this time, according to a thread allocation conditions described in the first embodiment, stream ID=1 is allocated to thread #1, which is a dedicated thread. Stream ID=2 is allocated to thread #2, which is a dedicated thread. Stream IDs=3 to 5 are allocated to thread #3, which is a mixing thread. As a result, the stream IDs (stream IDs=1 to 3) that have high randomness are allocated to one of threads #1 to #3. As such, the local WAF of each of threads #1 to #3 approaches the random WAF.

Figure 23:
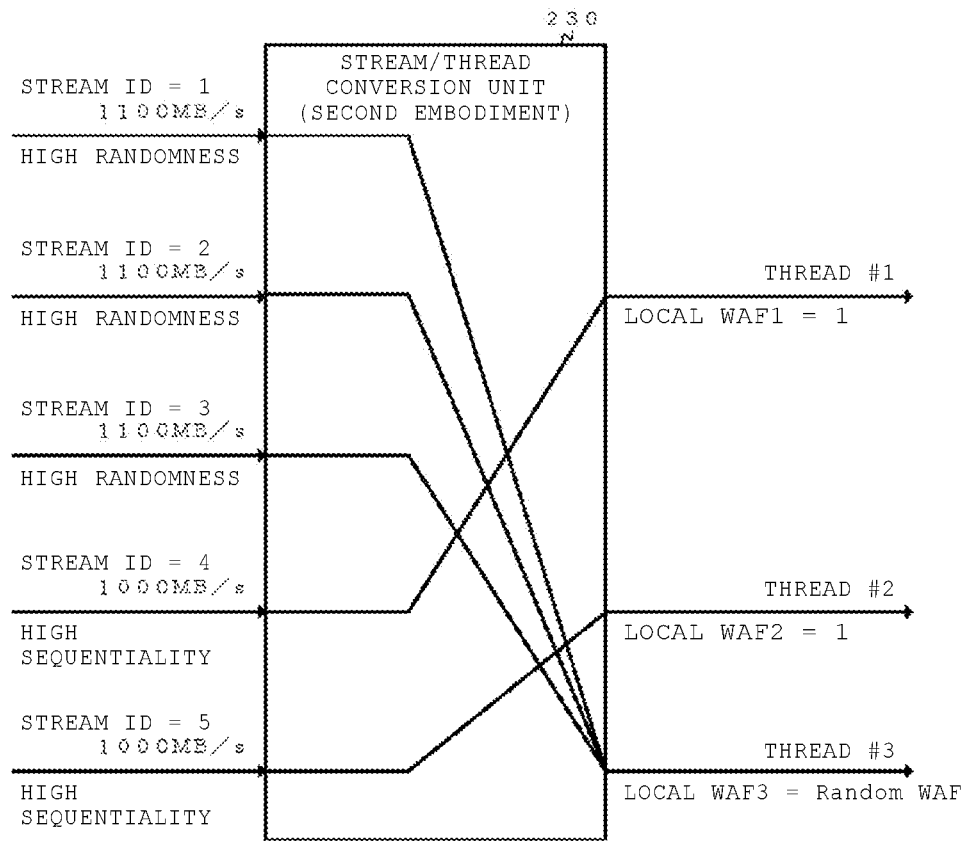
FIG. 23 illustrates a first example of thread allocation according to the second embodiment.

FIG. 23 illustrates an example of the allocation of the thread 800 by the stream/thread conversion unit 230 according to the second embodiment. The stream data that are transmitted from the host 2 in FIG. 23 are the same as that in FIG. 22.

The stream/thread conversion unit 230 according to the second embodiment allocates stream IDs=1 to 3 that have high randomness, to thread #3, which is the mixing thread. Stream ID=1 that has high sequentiality is allocated to thread #1, which is the dedicated thread. Stream ID=2 that has high sequentiality is allocated to thread #2, which is the dedicated thread. As a result, only the local WAF of thread #3 approaches the random WAF. On the other hand, the local WAF of thread #1 to which the stream data that have high sequentiality are allocated, when these pieces of stream data are assumed to be collectively invalidated, is one. In the same manner, the local WAF of thread #2 is also one.

Figure 24:
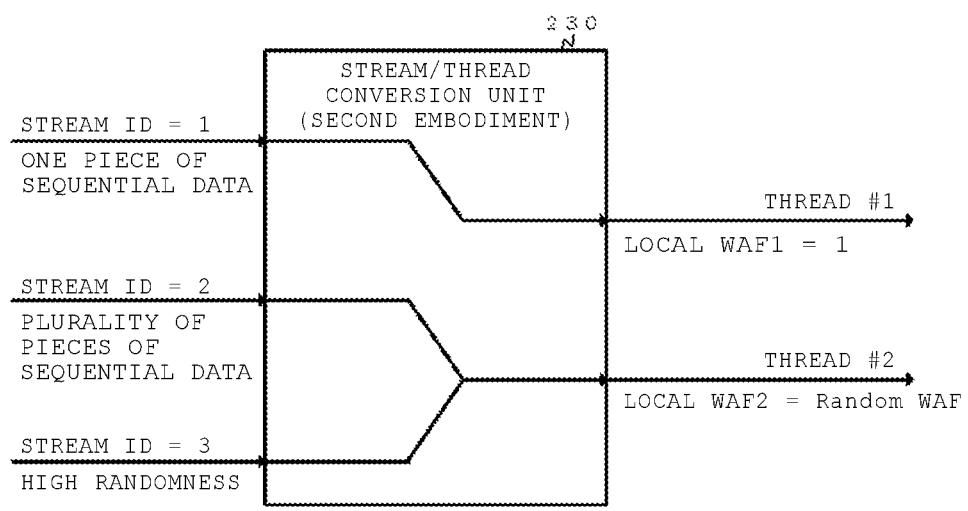
FIG. 24 illustrates a second example of the thread allocation according to the second embodiment.

FIG. 24 illustrates another example of the allocation of the thread 800 by the stream/thread conversion unit 230 according to the second embodiment. As illustrated in FIG. 24, it is assumed that three pieces of stream data, stream IDs=1 to 3, are transmitted from the host 2. Stream ID=1 is assumed to be one piece of sequential data. Stream ID=2 is assumed to include a plurality of pieces of sequential data. Stream ID=3 is assumed to be random data. At this point, it is assumed that the semiconductor storage device 1 has a maximum of two threads 800.

In a case where a plurality of pieces of sequential data is transmitted with one stream ID, the stream/thread conversion unit 230 according to the present embodiment allocates the stream ID to the mixing thread. That is, stream ID=2 that includes a plurality of pieces of sequential data is allocated to thread #2, which is the mixing thread, along with stream ID=3 that has the random data.

As described briefly above, the stream/thread conversion unit 230 according to the present embodiment allocates the thread in accordance with the sequentiality of the stream data. As a result, the WAF of the entire device can be reduced.

Figure 25A:
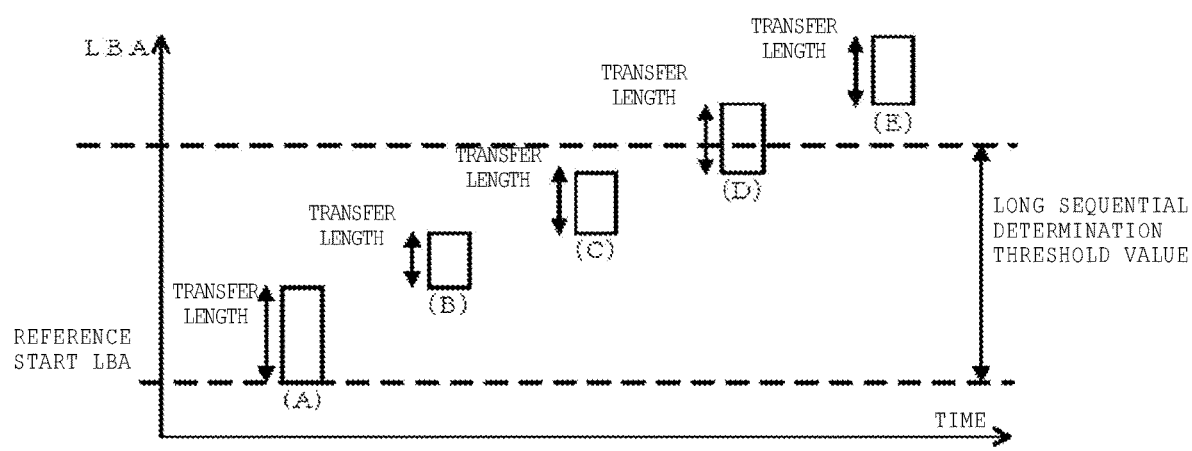
FIGS. 25A and 25B are time charts for describing an algorithm of determining sequentiality by a semiconductor storage device according to the second embodiment.
Figure 25B:
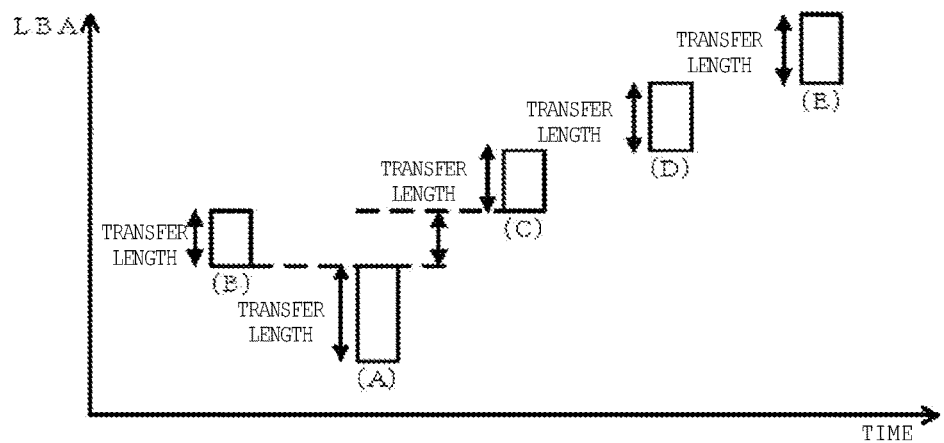

Next, an outline of an algorithm for determining sequentiality is described with reference to FIGS. 25A and 25B. FIGS. 25A and 25B illustrate the start LBAs and the transfer lengths of pieces of stream data (which are referred to as data (A) to data (E)) that are transferred with WRITE STREAM command (A) to WRITE STREAM command (E).

In the semiconductor storage device 1 according to the second embodiment, the stream control unit 220 determines the sequentiality by using the start LBA and the transfer length, which are input from the host IF control unit 100. The stream control unit 220 stores the start LBA as a reference for pieces of stream data that have the same stream ID. That is, in an example illustrated in FIG. 25A, the stream control unit 220 stores the start LBA of data (A) as the reference. The stream control unit 220 stores the accumulation amount, which results from accumulating transfer lengths of each of data (B) to data (E) that have an LBA range which is contiguous to an LBA range of data (A). Then, upon reception of data (D), the accumulation amount is equal to or larger than a long sequential determination threshold value that is set in advance, the stream control unit 220 determines that the sequentiality of the stream data is high.

Depending on the way in which the host 2 transfers the stream data, the semiconductor storage device 1 may not always receive, in LBA order, the stream data that have high sequentiality. In an example illustrated in FIG. 25B, the semiconductor storage device 1 receives pieces of stream data in the following order: data (B), data (A), data (C), data (D), and data (E). The stream control unit 220 can also determine the sequentiality of the pieces of stream data that are received even in this out-of-order manner.

Next, one example of a configuration of a long sequential determination table is described with reference to FIGS. 26A to 26G. The long sequential determination table can be built into the stream control unit 220. The stream control unit 220 determines the sequentiality of the stream data by using the long sequential determination table.

The long sequential determination table has a plurality of entries (rows). According to the second embodiment, the long sequential determination table has three entries. Each entry includes start LBA, end LBA, the accumulation amount, and a generation number. Furthermore, the long sequential determination table has a long determination flag register. The long sequential determination table is managed for every stream ID. That is, there is one long sequential determination table for each stream ID. The long sequential determination table may be initialized by the CPU 500 when the stream ID is assigned according to the STREAM CONTROL (OPEN) command.

In the following description, it is assumed that 0x700 is set for a long sequential determination threshold value.

FIG. 26A illustrates a state in which the long sequential determination table is initialized. Although omitted in FIG. 26A, all entries, that is, the start LBA, the end LBA, the accumulation amount, and the generation number are zero. The long determination flag is not set.

FIG. 26B illustrates a state of the long sequential determination table when the WRITE STREAM command (command A) designating the transfer length=0x200 sectors from start LBA=0x1000 is issued in a state in FIG. 26A. The start LBA at entry 0 is set as 0x1000. The end LBA is the start LBA+the transfer length−1 and thus is set as 0x11FF. The accumulation amount at entry 0 results from adding the transfer length of command A (0x200) to the existing accumulation amount (0x000), and thus is set as 0x200. The generation number at the entry at which command information is newly registered is one. That is, the generation number at entry 0 is set as one.

FIG. 26C illustrates a state of the long sequential determination table when the WRITE STREAM command (command B) designating the transfer length=0x100 sectors from start LBA=0x1200 is issued in a state in FIG. 26B. The start LBA of command B is contiguous to the end LBA at entry 0. Therefore, information of command B is registered at entry 0. The start LBA at entry 0 remains 0x1000, and the end LBA is updated to 0x12FF, which is the end LBA of command B. The accumulation amount at entry 0 results from adding the number of transfers of command B (0x100) to the existing accumulation amount (0x200), and thus is updated to 0x300. The generation number at the entry that has the LBA range which is contiguous to the LBA range of the received command is set to one. That is, the generation number at entry 0 remains one.

FIG. 26D illustrates a state of the long sequential determination table when the WRITE STREAM command (command C), the transfer length=0x200 sectors from start LBA=0x1400 is issued in a state in FIG. 26C. The start LBA of command C is not contiguous to the end LBA at entry 0. At this time, information of command C is registered at entry 1. The start LBA at entry 1 is set as 0x1400, and the end LBA is set as 0x15FF. The accumulation amount at entry 1 results from adding the number of transfers of command C (0x200) to the existing accumulation amount (0x000), and thus is set as 0x200. The generation number at the entry at which the command information is newly registered is one. That is, the generation number at entry 1 is set as one. At entries at which the accumulation amount is not zero other than the entry at which the command information is newly registered, the generation number is incremented by one. That is, the generation number at entry 0 is updated to two.

FIG. 26E illustrates a state of the long sequential determination table when the WRITE STREAM command (command D) designating the transfer length=0x100 sectors from start LBA=0x0E00 is issued in a state in FIG. 26D. The start LBA of command D is not contiguous to any one of the end LBA at entry 0 and the end LBA at entry 1. At this time, information of command D is registered at entry 2. The start LBA at entry 2 is set as 0x0E00 and the end LBA is set as 0x0EFF. The accumulation amount at entry 2 results from adding the transfer length of command D (0x100) to the existing accumulation amount (0x000), and thus is set as 0x100. The generation number at the entry at which the command information is newly registered is one. That is, the generation number at entry 2 is set as one. At entries at which the accumulation amount is not zero other than the entry at which the command information is newly registered, the generation number is incremented by one. That is, the generation number at entry 0 is updated to three. The generation number at entry 1 is updated to two.

FIG. 26F illustrates a state of the long sequential determination table when the WRITE STREAM command (command E) designating the transfer length=0x100 sectors from start LBA=0x1300 is issued in a state in FIG. 26E. The start LBA of command E is contiguous to the end LBA at entry 0. Furthermore, the end LBA of command E is contiguous to the start LBA at entry 1. At this time, information at entry 0, information at entry 1, and information of command E are merged, and a result of the merging is registered at an entry at which the start LBA is smallest, that is, at entry 0. The start LBA at entry 0 remains 0x1000. The end LBA at entry 0 is updated to 0x15FF, which is the end LBA at entry 1. The accumulation amount at entry 0 results from adding the accumulation amount at entry 1 (0x200) and the number of transfers of command E (0x100) to the existing accumulation amount (0x300), and thus is updated to 0x600. At the entries that are merged, the generation number at the entry at which the start LBA is smallest is one. That is, the generation number at entry 0 is updated to one. Among the entries that are merged, the entry at which the start LBA is not smallest is initialized. That is, entry 1 is initialized. The generation numbers of the entries at which the accumulation amounts are not zero, are re-numbered (as two, three, and so forth), starting with an entry that has the smallest generation number, excepting for the entries that are merged. That is, the generation number at entry 2 is updated from one to two.

FIG. 26G illustrates a state of the long sequential determination table when the WRITE STREAM command (command F) designating the transfer length=0x100 sectors from start LBA=0x0F00 is issued in a state in FIG. 26F. The start LBA of command F is contiguous to the end LBA at entry 2. Furthermore, the end LBA of command F is contiguous to the start LBA at entry 0. At this time, information at entry 0, information at entry 2, and information of command F are merged, and a result of the merging is registered at an entry at which the start LBA is smallest, that is, at entry 2. The start LBA at entry 2 remains 0x0E00. The end LBA at entry 2 is updated to 0x15FF, which is the end LBA at entry 0. The accumulation amount at entry 2 results from adding the accumulation amount at entry 0 (0x600) and the number of transfers of command F (0x100) to the existing accumulation amount (0x100), and thus is updated to 0x800. At the entries that are merged, the generation number at the entry at which the start LBA is smallest is one. That is, the generation number at entry 2 is updated to one. Among the entries that are merged, the entry at which the start LBA is not smallest is initialized. That is, entry 0 is initialized.

At this point, because the accumulation amount at entry 2 is equal to or larger than the long sequential determination threshold value (0x700), the long determination flag is set.

Upon receiving commands, in a case where when the numbers of accumulations at all entries are not zero, the LBA range of the received commands is non-contiguous to the start LBA or the end LBA at any entry, an entry that has the largest generation number is initialized. It is noted that, in this case, an entry that has the smallest accumulation amount may be initialized. Then, information of the received command is registered at the initialized entry.

Next, a procedure in which the stream control unit 220 according to the second embodiment updates the long sequential determination table is described with reference to FIG. 27.

When receiving the WRITE STREAM command (S300), the stream control unit 220 determines whether or not there is an entry at which the accumulation amount is not zero and the start LBA or the end LBA is contiguous to the LBA range of the received command (S301).

In a case where there is no entry at which the LBA is contiguous (No in S301), the stream control unit 220 determines whether or not there is an entry at which the accumulation amount is zero (S302). In a case where there is the entry at which the accumulation amount is zero (Yes in S302), the stream control unit 220 registers the command information at the entry that has the smallest entry number (S303), among entries at which the accumulation amount is zero. At this time, the generation number of the entry is set to one. In a case where there is no entry at which the accumulation amount is zero (No in S302), the stream control unit 220 initializes the entry that has the largest generation number or has the smallest accumulation amount (S304).

In a case where there is the entry at which LBA is contiguous (Yes in S301), the stream control unit 220 determines whether or not there are entries that are able to be merged (S305). That is, it is determined whether or not there are both an entry (a first entry) that has the end LBA which is contiguous to the start LBA of the received command, and an entry (a second entry) that has the start LBA which is contiguous to the end LBA of the received command.

In a case where there are no entries that are able to be merged, that is, in a case where there is only one of the first entry and the second entry (No in S305), the stream control unit 220 registers the command information at the first entry or the second entry (S306). Specifically, in a first case where the command information is registered at the first entry, the end LBA of the received command is registered as the end LBA at the first entry, without changing the start LBA at the first entry. Furthermore, in a second case where the command information is registered at the second entry, the start LBA of the received command is registered as the start LBA at the second entry, and the end LBA at the second entry is not changed. In any of the first case and the second case, the transfer length of the received command is added to the accumulation amount at the entry, and the generation number at the entry is set to one. Furthermore, at an entry that is not a registration target, the generation number at the entry at which the accumulation amount is not zero, is incremented by one (S307).

In a case where there are the entries that are able to be merged, that is, in a case where there are both of the first entry and the second entry (Yes in S305), the stream control unit 220 registers information of the second entry and the command information, at the first entry, by merging them (S308). That is, the start LBA at the first entry is not changed. The end LBA at the second entry is registered as the end LBA at the first entry. A value which results from adding the transfer length of the received command to a sum of the accumulation amount at the first entry and the accumulation amount at the second entry is registered as the accumulation amount at the first entry. The generation number at the first entry is set to one. Furthermore, the generation numbers at the entries at which the accumulation amounts are not zero, are re-numbered (as two, three, and so forth) in ascending order of the generation number, excepting for the merging target entries (S309).

It is noted that, in any of the case where there are no entries that are able to be merged (No in S305) and the case where there are the entries that are able to be merged (Yes in S305), there is a case where there are two or more first entries or a case where there are two or more second entries.

In these cases, the stream control unit 220, for example, selects any one of the two or more first entries (or the two or more second entries), and performs the processing described above.

Next, the stream control unit 220 determines whether or not any entry at which the accumulation amount is equal to or larger than the long sequential determination threshold value exists (S310), and in a case where there is an entry that has such accumulation amount (Yes in S310), sets the long determination flag (S311).

Next, one example of a configuration of the stream/thread conversion table 232 according to the second embodiment is described with reference to FIG. 28.

According to the second embodiment, the long determination flag is added to the stream/thread conversion table 232 of the first embodiment. It is noted that the long determination flag, along with the stream ID, is input into the stream/thread conversion unit 230 from the stream control unit 220.

Figure 28:
FIG. 28 illustrates a configuration of a stream/thread conversion table according to the second embodiment.

As illustrated in FIG. 28, the long determination flag is not set for stream IDs=5 and 7. At this time, according to the thread allocation conditions described in the first embodiment, stream IDs=5 and 7 that have the fifth and seventh ranked priority levels, respectively, are defined as having to be allocated to threads #5 and #7, respectively, which are the dedicated threads. However, thread determination unit 234 according to the present embodiment allocates stream IDs=5 and 7 for which the long determination flag is not set, to thread #8, which is the mixing thread, regardless of the priority level. As a result, stream IDs=6, 8, and 9 that have the sixth, eighth, and ninth ranked priority levels, respectively, are allocated to threads #5, thread #6, and thread #7, respectively, which are the dedicated threads.

It is noted that the stream IDs for which the long determination flag is not set are allocated to the mixing thread regardless of the priority level. Instead, the priority level of such stream IDs that is determined from the host throughput, may be lowered. Furthermore, in a case where the host 2 determines a priority level (the case of S200 in FIG. 19), the host 2 may determine the priority level in accordance with the sequentiality of the stream data. In a case where the semiconductor storage device 1 determines the priority level (the case of S202 in FIG. 19), the host 2 may notify the semiconductor storage device 1 of the sequentiality of the stream data. In this case, the sequentiality is notified to the semiconductor storage device 1, for example, by the STREAM CONTROL (OPEN) command.

According to the semiconductor storage device according to the second embodiment, the WAF of the semiconductor storage device can be reduced because a dedicated thread is allocated with higher priority to the stream ID that has higher sequentiality.

Third Embodiment

In a semiconductor storage device according to a third embodiment, the semiconductor storage device 1 by itself assigns a stream ID to each piece of data based on data sequentiality. That is, according to the third embodiment, each piece of stream data is suitably allocated to each thread even when communicating with a host that does not transmit the stream data explicitly.

Same as in the manner in the second embodiment, in the semiconductor storage device 1 according to the third embodiment, the stream control unit 220 determines the sequentiality using the start LBA and the transfer length that are input from the host IF control unit 100. An algorithm that is used for the determination of the sequentiality is the same as that in the second embodiment. That is, when the accumulation amount of data that is sequentially linked from a reference start LBA is equal to or larger than the long sequential determination threshold value, the stream control unit 220 determines that the data sequentiality is high. According to the third embodiment, the stream control unit 220 adds the stream ID to the data for which sequentiality is determined to be high.

In the semiconductor storage device 1 according to the second embodiment, there is one long sequential determination table for one stream ID. In contrast, according to the third embodiment, the data sequentiality is determined with reference to one long sequential determination table that is built into the stream control unit 220.

FIG. 29A to 29H illustrate one example of the configuration of the long sequential determination table. The long sequential determination table has a plurality of entries (rows). Here, the long sequential determination table has three entries. Each entry includes start LBA, end LBA, the accumulation amount, a generation number, and a stream ID. The long sequential determination table may be initialized by the CPU 500 at a predetermined timing. In the following description, it is assumed that 0x700 is set for the long sequential determination threshold value.

FIG. 29A illustrates a state in which the long sequential determination table is initialized. Although omitted in FIG. 29A, the start LBA, the end LBA, the accumulation amount, the generation number, and the stream ID of all entries are zero.

FIGS. 29B to 29F are conceptually similar to FIGS. 26B and 26F, respectively, and thus repeated description thereof is omitted. According to the third embodiment, a general command used for the data write (a WRITE command), including the WRITE STREAM command, is a determination target of the sequentiality.

FIG. 29G illustrates a state of the long sequential determination table when the WRITE command (command F) designating the transfer length=0x200 sectors from start LBA=0x2000 is issued in a state in FIG. 29F. The start LBA of command F is not contiguous to any one of the end LBA at entry 0 and the end LBA at entry 2. At this time, information of command F is registered at entry 1. The start LBA at entry 1 is set as 0x2000, and the end LBA is set as 0x21FF. The accumulation amount at entry 1 results from adding the number of transfers of command F (0x200) to the existing accumulation amount (0x000), and thus is set as 0x200. The generation number at the entry at which the command information is newly registered is one. That is, the generation number at entry 1 is set as one. At entries at which the accumulation amount is not zero other than the entry at which the command information is newly registered, the generation number is incremented by one. That is, the generation number at entry 0 is updated to two, and the generation number at entry 2 is updated to three.

FIG. 29H illustrates a state of the long sequential determination table when the WRITE command (command G) designating the transfer length=0x100 sectors from start LBA=0x0F00 is issued in a state in FIG. 29G. The start LBA of command G is contiguous to the end LBA at entry 2. Furthermore, the end LBA of command F is contiguous to the start LBA at entry 0. At this time, information at entry 0, information at entry 2, and information of command F are merged, and a result of the merging is registered at an entry at which the start LBA is smallest, that is, at entry 2. The start LBA at entry 2 remains 0x0E00. The end LBA at entry 2 is updated to 0x15FF that is the end LBA at entry 0. The accumulation amount at entry 2 results from adding the accumulation amount at entry 0 (0x600) and the number of transfers of command F (0x100) to the existing accumulation amount (0x100), and thus is updated to 0x800. At the entries that are merged, the generation number at the entry at which the start LBA is smallest is one. That is, the generation number at entry 2 is set as one. Among the entries that are merged, the entry at which the start LBA is not smallest is initialized. That is, entry 0 is initialized. The generation numbers of the entries at which the accumulation amounts are not zero, are re-numbered (as two, three, and so forth), starting with an entry that has the smallest generation number, excepting for the entries that are merged. That is, the generation number at entry 1 is updated from one to two.

At this point, because the accumulation amount at entry 2 is equal to or larger than the long sequential determination threshold value (0x700), a stream ID is assigned to entry 2. Any stream ID may be assigned, but at this point, one is allocated. The stream ID is assigned to data that belongs to the entry to which the stream ID is assigned.

The stream ID is not assigned to random write data that belongs to an entry of which the accumulation amount is smaller than the long sequential determination threshold value. That is, the stream control unit 220 according to the present embodiment can separate the stream data and the random write data from among data of a plurality of WRITE commands that are received.

Upon reception of WRITE commands thereafter, if the accumulation amount is equal to or larger than the long sequential determination threshold value, a different stream ID (for example, two) is assigned to entry 1 in the same manner. That is, the stream control unit 220 according to the third embodiment can extract a plurality of pieces of stream data from data of the plurality of WRITE commands that are received and can assign different stream IDs.

The stream/thread conversion unit 230 according to the third embodiment performs the allocation of the thread 800 in the same manner as in the first embodiment, based on the stream ID that is assigned to each piece of data by the stream control unit 220 as described above. That is, a dedicated thread 800 is allocated with higher priority to the stream ID that has higher host throughput. Furthermore, the stream/thread conversion unit 230 allocates random write data to the mixing thread.

According to the semiconductor storage device according to the third embodiment, as described above, because the semiconductor storage device assigns the stream IDs and allocates the threads to the stream IDs that have higher sequentiality and higher host throughput, the WAF of the semiconductor storage device can be reduced even when communicating with the host that does not transmit the stream data explicitly.

Fourth Embodiment

In the semiconductor storage device according to the first embodiment, in order to reduce the WAF, a higher priority level is allocated to the stream ID that has a higher host throughput, and according to the priority level, a thread is allocated. In contrast, in the semiconductor storage device according to the fourth embodiment, in order to improve a throughput between the semiconductor storage device and the host, the thread is allocated in accordance with a maximum throughput of each thread.

Here, a maximum throughput of each thread 800 is referred to as a maximum thread throughput. The maximum thread throughput is determined based on the ability to transfer data from the memory controller 10 to the NAND flash memory 20. The maximum thread throughput may be the same among the threads 800 or may vary from one thread 800 to another. In some instances, the maximum thread throughput can be lower than the highest possible operational throughput. For example, when the semiconductor storage device 1 is set to be in a low power consumption mode, or the like, the maximum thread throughput may be lower than that during a normal operation mode. Furthermore, the maximum thread throughput changes also depending on the number of channels between the memory controller 10 and the NAND flash memory 20 in which the write data are written via the thread 800, or on the number of bank interleaves.

The host throughput according to the fourth embodiment is determined in the same manner as in the first embodiment.

Figure 30:
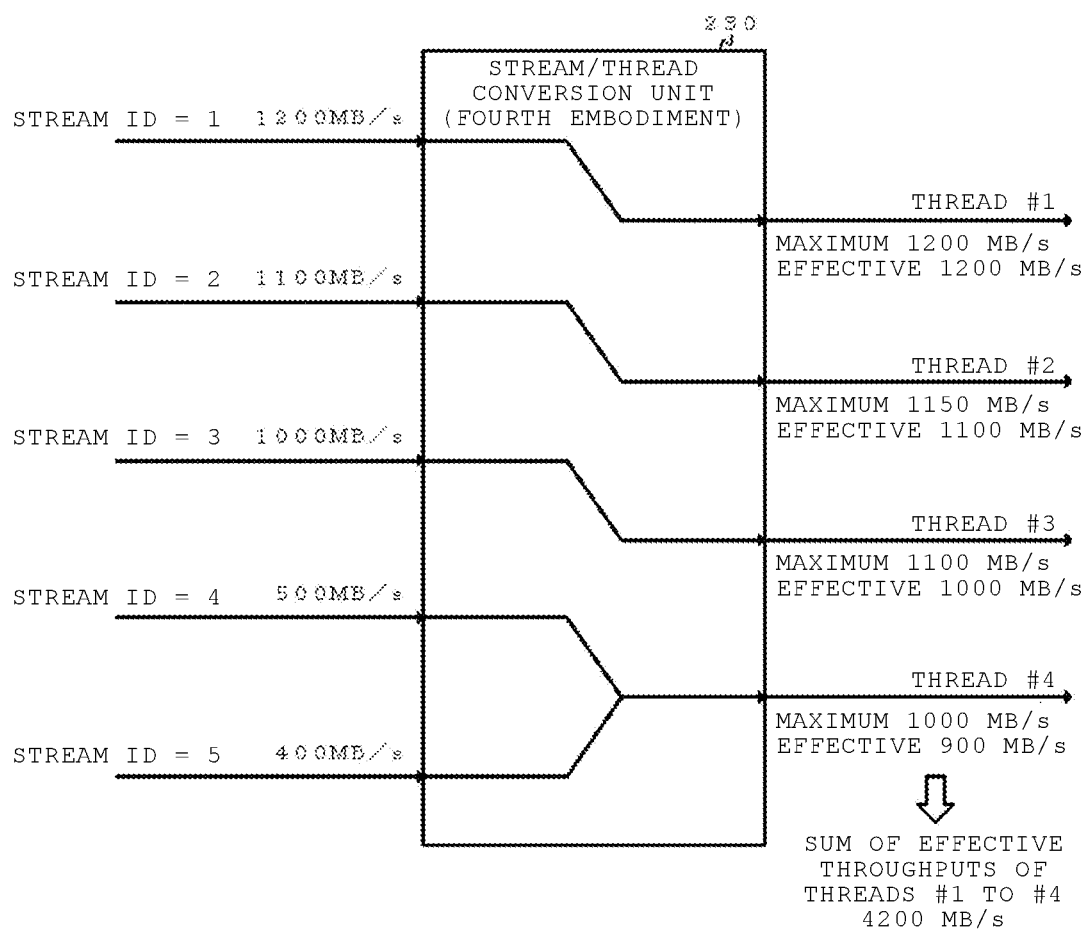
FIG. 30 illustrates a first example of thread allocation according to a fourth embodiment.

FIG. 30 illustrates an example of the allocation of the thread 800 by a stream/thread conversion unit 230 according to the fourth embodiment. Like in FIG. 13, for simplification, it is assumed that the semiconductor storage device 1 has a maximum of four threads 800.

Host throughputs of stream IDs=1 to 5 are the same as in the case in FIG. 13. A maximum thread throughput of thread #1 is 1200 MB/s. A maximum thread throughput of thread #2 is 1150 MB/s. A maximum thread throughput of thread #3 is 1100 MB/s. A maximum thread throughput of thread #4 is 1000 MB/s.

The stream/thread conversion unit 230 allocates five stream IDs to four threads 800. The stream/thread conversion unit 230, with higher priority, allocates the stream ID that has higher host throughput, to the thread 800 that has higher maximum thread throughput. That is, stream ID=1 that has the highest host throughput is allocated to thread #1 that has the highest maximum thread throughput. That is, stream ID=2 that has the second highest host throughput is allocated to thread #2 that has the second highest maximum thread throughput. That is, stream ID=3 that has the third highest host throughput is allocated to thread #3 that has the third highest maximum thread throughput. Stream IDs 4 and 5 that have the fourth and fifth highest host throughputs, respectively, are allocated to thread #4 in a mixed/joint manner.

As a result of allocating the stream IDs to the threads 800, respectively, in this manner, an effective thread throughput of thread #1 is 1200 MB/s. An effective thread throughput of thread #2 is 1100 MB/s. An effective thread throughput of thread #3 is 1000 MB/s. An effective thread throughput of thread #4 is 900 MB/s. A sum of the effective thread throughputs is 4200 MB/s.

Figure 31:
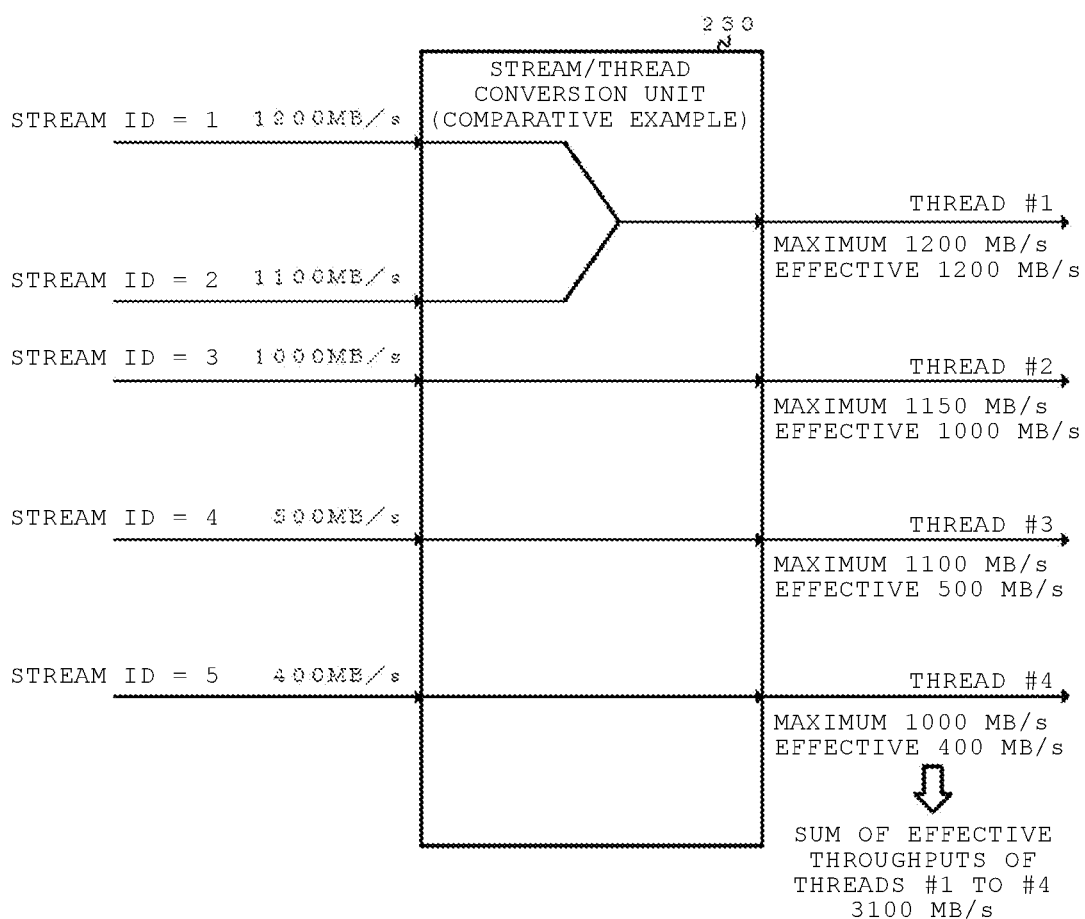
FIG. 31 illustrates a first example of thread allocation according to the comparative example.

Next, an example of the allocation of the thread 800 by a stream/thread conversion unit 230 according to a comparative example is described with reference to FIG. 31.

The host throughputs of the stream data are the same as in the case in FIG. 30. The maximum thread throughput of each thread 800 is also the same as in the case in FIG. 30. The stream/thread conversion unit 230 in the comparative example allocates stream ID=1 that has the highest host throughput, and stream ID=2 that has the second highest host throughput, to thread #1 in a mixed/joint manner. Furthermore, the stream/thread conversion unit 230 in the comparative example allocates stream IDs=3, 4, and 5 that have the third and later highest host throughputs, to thread #2, thread #3, and thread #4, respectively.

As a result of allocating the stream IDs to the threads 800, respectively, in this manner, an effective thread throughput of thread #1 is 1200 MB/s. An effective thread throughput of thread #2 is 1000 MB/s. An effective thread throughput of thread #3 is 500 MB/s. An effective thread throughput of thread #4 is 400 MB/s. A sum of the effective thread throughputs is 3100 MB/s, which is lower than in the case with the fourth embodiment. That is, performance decreases in the comparative example.

Next, another example of the allocation of the thread 800 by the stream/thread conversion unit 230 according to the fourth embodiment is described with reference to FIG. 32.

The host throughputs of stream IDs=1 to 5 are the same as in the case in FIG. 30. A maximum thread throughput of thread #1 is 800 MB/s. A maximum thread throughput of thread #2 is 750 MB/s. A maximum thread throughput of thread #3 is 700 MB/s. A maximum thread throughput of thread #4 is 650 MB/s. In the case of FIG. 32, the maximum thread throughput is lower than the host throughput.

The stream/thread conversion unit 230 allocates five stream IDs to four threads 800. The stream/thread conversion unit 230, with higher priority, allocates the stream ID that has higher host throughput, to the thread 800 that has higher maximum thread throughput. That is, stream ID=1 that has the highest host throughput is allocated to thread #1 that has the highest maximum thread throughput. That is, stream ID=2 that has the second highest host throughput is allocated to thread #2 that has the second highest maximum thread throughput. That is, stream ID=3 that has the third highest host throughput is allocated to thread #3 that has the third highest maximum thread throughput. Pieces of stream data that have stream IDs 4 and 5 which have the fourth and fifth highest host throughputs, respectively, are allocated to thread #4 in a mixed/joint manner.

As a result of allocating the stream IDs to the threads 800, respectively, in this manner, an effective thread throughput of thread #1 is 800 MB/s. An effective thread throughput of thread #2 is 750 MB/s. An effective thread throughput of thread #3 is 700 MB/s. An effective thread throughput of thread #4 is 650 MB/s. A sum of the effective thread throughputs is 2900 MB/s.

Figure 33:
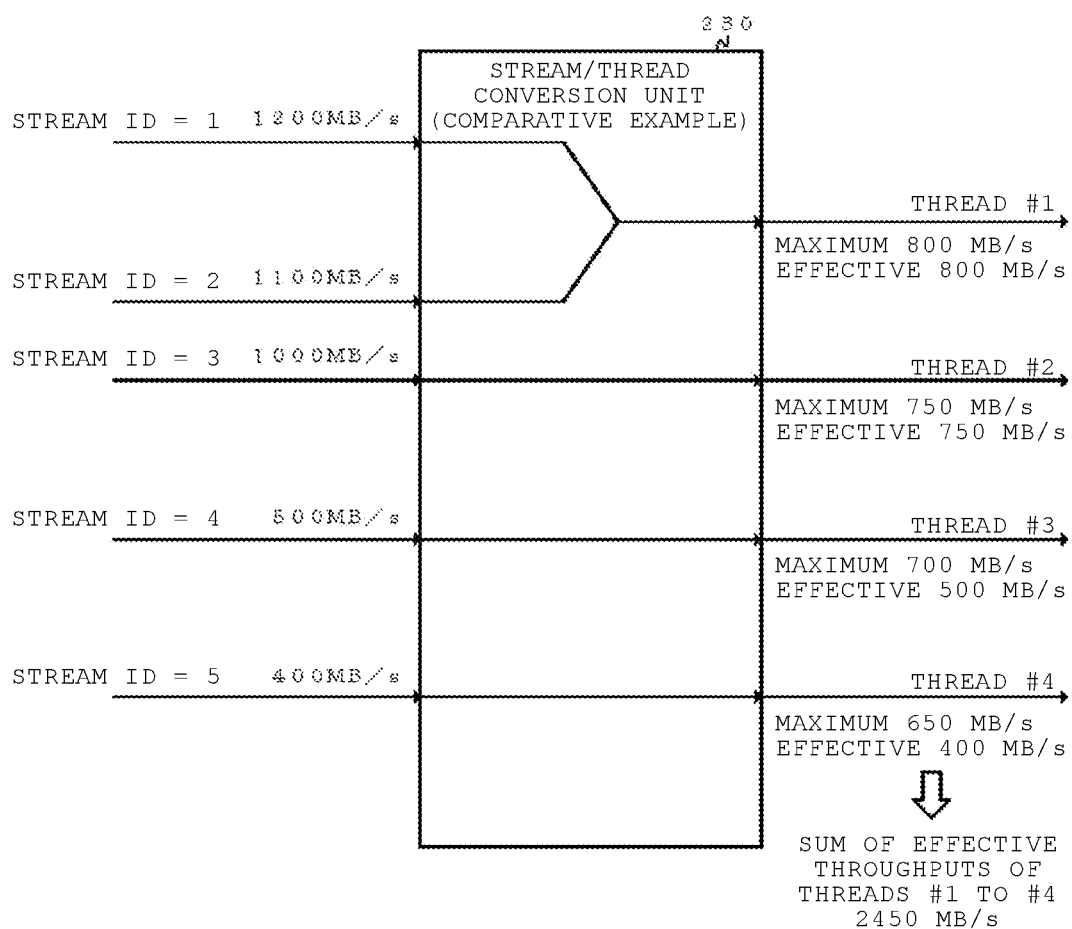
FIG. 33 illustrates a second example of the thread allocation according to the comparative example.

Next, the same example of the allocation of the thread 800 by a stream/thread conversion unit 230 according to a comparative example is described with reference to FIG. 33.

Figure 32:
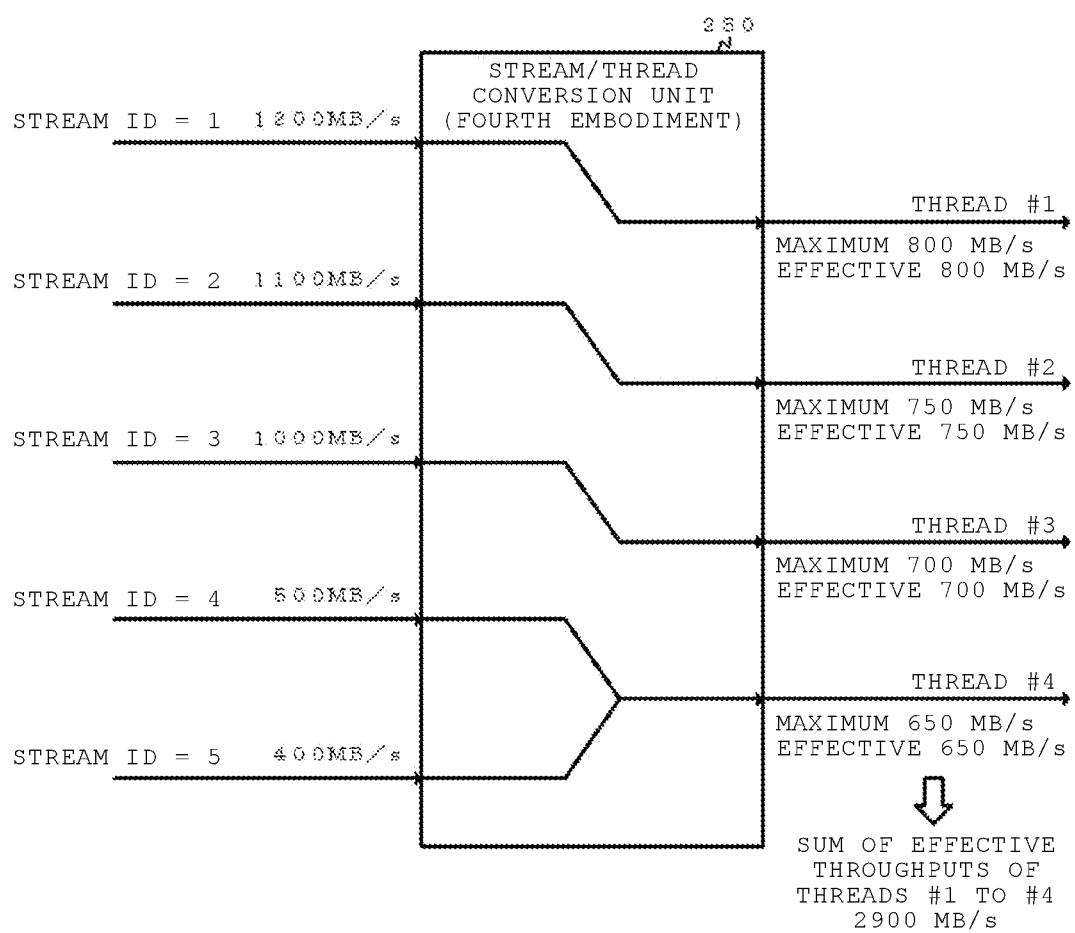
FIG. 32 illustrates a second example of the thread allocation according to the fourth embodiment.

The host throughputs of the stream data are the same as in the case in FIG. 32. The maximum thread throughput of each thread 800 is also the same as in the case in FIG. 32. The stream/thread conversion unit 230 in the comparative example allocates stream ID=1 that has the highest host throughput, and stream ID=2 that has the second highest host throughput, to thread #1 in a mixed/joint manner. Furthermore, the stream/thread conversion unit 230 in the comparative example allocates pieces of stream data that have stream IDs=3, 4, and 5 that have the third, and later highest host throughputs, to thread #2, thread #3, and thread #4, respectively.

As a result of allocating the stream IDs to the threads 800, respectively, in this manner, an effective thread throughput of thread #1 is 800 MB/s. An effective thread throughput of thread #2 is 750 MB/s. An effective thread throughput of thread #3 is 500 MB/s. An effective thread throughput of thread #4 is 400 MB/s. A sum of the effective thread throughputs is 2450 MB/s, which is lower than in the case of the present embodiment. That is, performance decreases in the comparative example.

Next, an algorithm for the allocation of the thread 800 by the stream/thread conversion unit 230 according to the present embodiment is described with reference to FIGS. 34 to 35.

The host throughputs of stream IDs=1 to 5 are defined as Qs1 to Qs5, respectively. Maximum thread throughputs of thread #1 to thread #4 are defined as T1 to T4, respectively.

Figure 34:
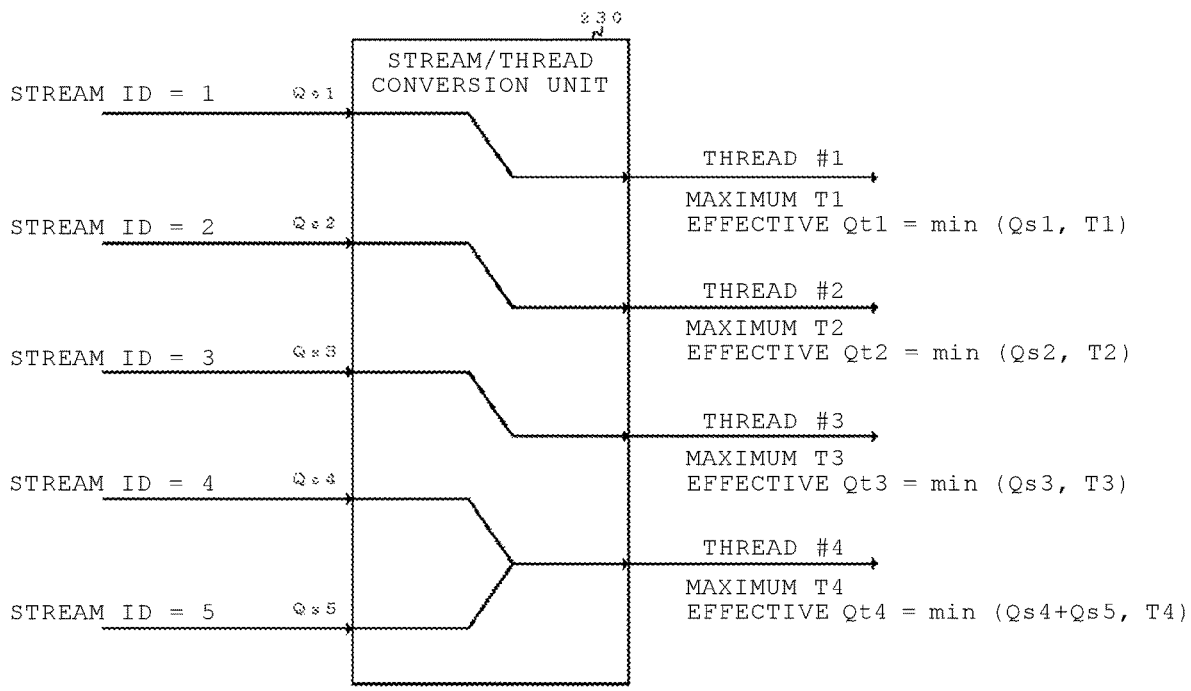
FIGS. 34 and 35 illustrate examples of thread allocation according to the fourth embodiment.

First, as illustrated in FIG. 34, it is assumed that stream ID=1, stream ID=2, stream ID=3, and stream ID=4 and stream ID=5 are allocated to thread #1, thread #2, thread #3, and thread #4, respectively. In this case, an effective thread throughput Qt1 of thread #1 is Qt1=min (Qs1, T1). An effective thread throughput Qt2 of thread #2 is Qt2=min (Qs2, T2). An effective thread throughput Qt3 of thread #3 is Qt3=min (Qs3, T3). An effective thread throughput Qt4 of thread #4 is Qt4=min (Qs4+Qs5, T4).

Figure 35:
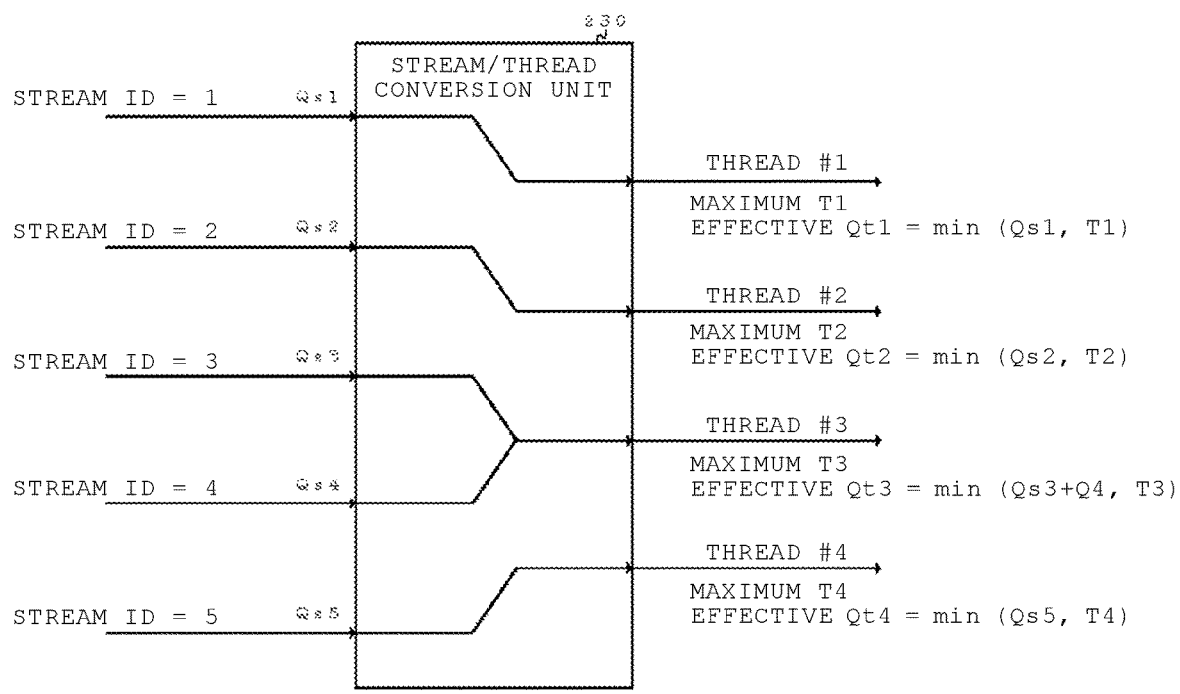

Next, as illustrated in FIG. 35, it is assumed that stream ID=1, stream ID=2, stream ID=3 and stream ID=4, and stream ID=5 are allocated to thread #1, thread #2, thread #3, and thread #4, respectively. In this case, an effective thread throughput Qt1 of thread #1 is Qt1=min (Qs1, T1). An effective thread throughput Qt2 of thread #2 is Qt2=min (Qs2, T2). An effective thread throughput Qt3 of thread #3 is Qt3=min (Qs3+Qs4, T3). An effective thread throughput Qt4 of thread #4 is Qt4=min (Qs5, T4).

The stream/thread conversion unit 230 selects a combination in which a sum of the effective thread throughputs, that is, Qt1+Qt2+Qt3+Qt4 is maximized, from among combinations of stream IDs that are allocated to the threads 800 as described above.

Moreover, in a case where there is a plurality of combinations in which the sum of the effective thread throughputs is at maximum, the dedicated thread 800, if possible, is allocated to the stream ID that has a high host throughput. As described in the first embodiment, this is because the WAF increases when a plurality of stream IDs that have a high host throughput is allocated to one thread 800.

According to the semiconductor storage device according to the fourth embodiment, as described above, the performance of the semiconductor storage device can be improved because the thread is allocated in such a manner that the sum of the effective thread throughputs is maximized.

According to the semiconductor storage device according to at least one embodiment, as described above, because a write destination of the stream data can be suitably selected in the nonvolatile semiconductor memory, reliability and performance of the semiconductor storage device can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable with a host, the memory system comprising:
   a nonvolatile memory including a plurality of blocks, each of the plurality of blocks being a unit for a data erase operation; and
   a controller electrically connected with the nonvolatile memory and configured to:
   assign N stream identifiers for use by the host, where N is an integer greater than two;
   in response to receiving, from the host, N pieces of stream data respectively associated with N stream identifiers:
   store M pieces of stream data into M first blocks respectively, where M is an integer smaller than N, and where the M pieces of stream data correspond to highest M priority levels among priority levels corresponding to the N pieces of stream data; and
   store a plurality of pieces of stream data into a single second block, each of the plurality of pieces of stream data corresponding to a priority level lower than any of the highest M priority levels, the plurality of pieces of stream data including at least a piece of first stream data and a piece of second stream data, the piece of first stream data corresponding to a lowest priority level among the priority levels corresponding to the N pieces of stream data, the piece of second stream data corresponding to a next-lowest priority level among the priority levels corresponding to the N pieces of stream data; and
   in a garbage collection operation,
   in a case where the first stream data is invalidated and the second stream data is not invalidated, copy the piece of second stream data from the second block to a third block before performing the data erase operation on the second block; and
   in a case where the first stream data is not invalidated and the second stream data is invalidated, copy the piece of first stream data from the second block to a fourth block before performing the data erase operation on the second block.

2. The memory system according to claim 1, wherein the priority level is assigned to each of the N pieces of stream data in accordance with a data throughput of each of the N pieces of stream data.

3. The memory system according to claim 2, wherein the data throughput is a throughput between the host and the memory system.

4. The memory system according to claim 3, wherein the controller is further configured to measure the data throughput of each of the N pieces of stream data.

5. The memory system according to claim 2, wherein a data throughput of each of the M pieces of stream data is higher than a data throughput of each of the plurality of pieces of stream data.

6. The memory system according to claim 1, wherein the priority level is assigned to each of the N pieces of stream data in accordance with a sequentiality of logical addresses associated therewith.

7. The memory system according to claim 6, wherein a sequentiality of logical addresses associated with each of the M pieces of stream data is higher than a sequentiality of logical addresses associated with each of the plurality of pieces of stream data.

8. The memory system according to claim 6, wherein the sequentiality of logical addresses associated with each of the N pieces of stream data is indicated in a command issued by the host.

9. The memory system according to claim 1, wherein the priority level is assigned to each of the N pieces of stream data in accordance with a command issued by the host.

10. The memory system according to claim 1, wherein stream data associated with a same stream identifier is expected to be invalidated at one time.

11. The memory system according to claim 1, wherein stream data associated with different stream identifiers are expected to be invalidated at different times.

12. The memory system according to claim 1, wherein the controller is configured to assign the N stream identifiers for use by the host in response to receiving a command from the host.

13. The memory system according to claim 1, wherein the controller includes (M+1) threads, each of the (M+1) threads including a buffer, and the controller is further configured to:
store each of the M pieces of stream data into the buffer of each of M threads before storing the M pieces of stream data into the M first blocks respectively; and
store the plurality of pieces of stream data into the buffer of one thread different from the M threads before storing the plurality of pieces of stream data into the second block.

14. A memory system connectable with a host, the memory system comprising:
a nonvolatile memory including a plurality of blocks, each of the plurality of blocks being a unit for a data erase operation; and
a controller electrically connected with the nonvolatile memory and configured to:
assign N stream identifiers for use by the host, where N is an integer greater than two;
in response to receiving, from the host, N pieces of stream data respectively associated with N stream identifiers:
store M pieces of stream data into M first blocks respectively, where M is an integer smaller than N, and the M pieces of stream data correspond to highest M data throughputs among data throughputs corresponding to the N pieces of stream data; and
store a plurality of pieces of stream data into a single second block, each of the plurality of pieces of stream data corresponding to a data throughput lower than any of the highest M data throughputs, the plurality of pieces of stream data including at least a piece of first stream data and a piece of second stream data, the piece of first stream data corresponding to a lowest data throughput among the data throughputs corresponding to the N pieces of stream data, the piece of second stream data corresponding to a next-lowest data throughput among the data throughputs corresponding to the N pieces of stream data; and in a garbage collection operation,
in a case where the first stream data is invalidated and the second stream data is not invalidated, copy the piece of second stream data from the second block to a third block before performing the data erase operation on the second block; and
in a case where the first stream data is not invalidated and the second stream data is invalidated, copy the piece of first stream data from the second block to a fourth block before performing the data erase operation on the second block.

15. The memory system according to claim 14, wherein the data throughput of each of the N pieces of stream data is a data throughput between the host and the memory system.

16. The memory system according to claim 15, wherein the controller is further configured to measure the data throughput of each of the N pieces of stream data.

17. The memory system according to claim 14, wherein stream data associated with a same stream identifier is expected to be invalidated at one time.

18. The memory system according to claim 14, wherein stream data associated with different stream identifiers are expected to be invalidated at different times.

19. The memory system according to claim 14, wherein the controller is configured to assign the N stream identifiers for use by the host in response to receiving a command from the host.

20. The memory system according to claim 14, wherein the controller includes (M+1) threads, each of the (M+1) threads including a buffer, and the controller is further configured to:
store each of the M pieces of stream data into the buffer of each of M threads before storing the M pieces of stream data into the M first blocks respectively; and
store the plurality of pieces of stream data into the buffer of one thread different from the M threads before storing the plurality of pieces of stream data into the second block.

* * * * *